United States Patent [19]
Kalman

[11] 3,856,674
[45] Dec. 24, 1974

[54] FILTERING PROCESS AND APPARATUS

[76] Inventor: Peter Gabor Kalman, 51 Compayne Gardens, London, England

[22] Filed: Mar. 23, 1973

[21] Appl. No.: 344,414

[52] U.S. Cl.................... 210/71, 210/77, 210/103, 210/489
[51] Int. Cl............................................ B01d 35/13
[58] Field of Search....... 210/71, 77, 103, 184, 186, 210/354, 387, 489

[56] References Cited
UNITED STATES PATENTS

| | | | |
|---|---|---|---|
| 3,471,017 | 10/1969 | Kalman | 210/71 |
| 3,645,399 | 2/1972 | Kalman | 210/77 |

*Primary Examiner*—Gerald A. Dost
*Attorney, Agent, or Firm*—Bacon & Thomas

[57] ABSTRACT

A process and apparatus for filtering a substance flowing through a passage in which a filter is introduced through inlet and outlet ports so that a part of the filter extends across the passage, a flowable sealing substance is provided in the ports and temperature conditions are established resulting in the formation in the ports of sealing plugs of the flowable sealing substance, the filter is supported across the passage by means of a movable backing support adapted to receive substance filtering through the filter and to enable the extraction therefrom of filtered substance, and the force applied to the backing support as the result of a hydrostatic pressure differential across the filter urging the filter against the backing support is equalized by applying to the backing support a counteracting force thereby to reduce the net force tending to restrict the ease of movement of the backing support, the movement of the filter through the ports to introduce another part thereof into the passage being effected under conditions providing for maintenance of the said sealing plugs. In some embodiments the counteracting force is developed as a result of a hydrostatic pressure differential across at least one other filter supported upon the movable backing support urging said at least one other filter against the backing support, whereas in other embodiments the passage forms a chamber across which the filter extends and, for hydrostatic force equalization, the filter is arranged so as to be subject on opposed surfaces thereof to the pressure of substance to be filtered, the filter having an interior permeable to the substance to be filtered and into which filtered substance flows and from which the filtered substance is extracted. Also disclosed are forms of filters adapted for use in such a process and apparatus.

119 Claims, 88 Drawing Figures

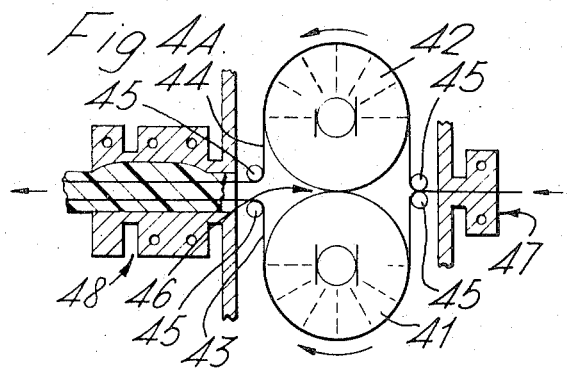
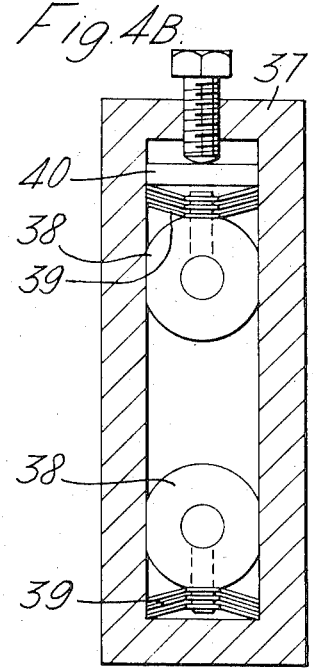
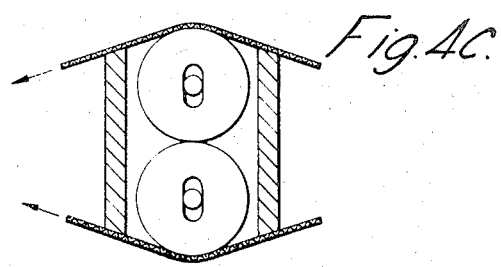
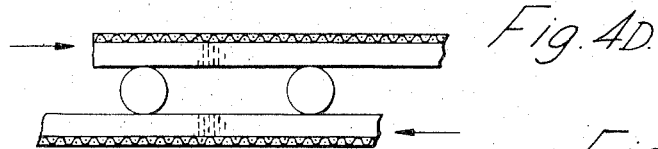
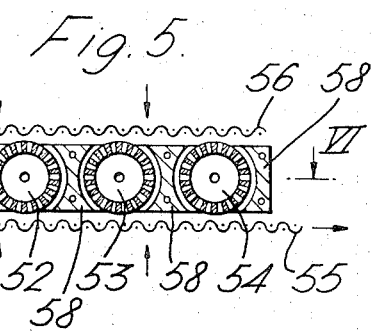
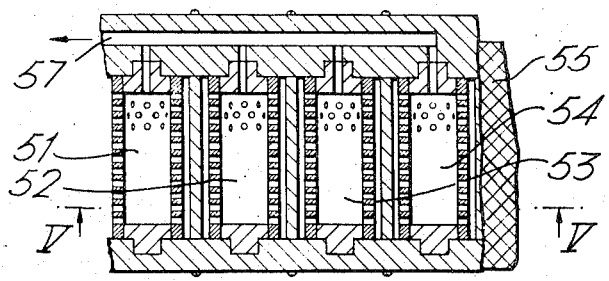

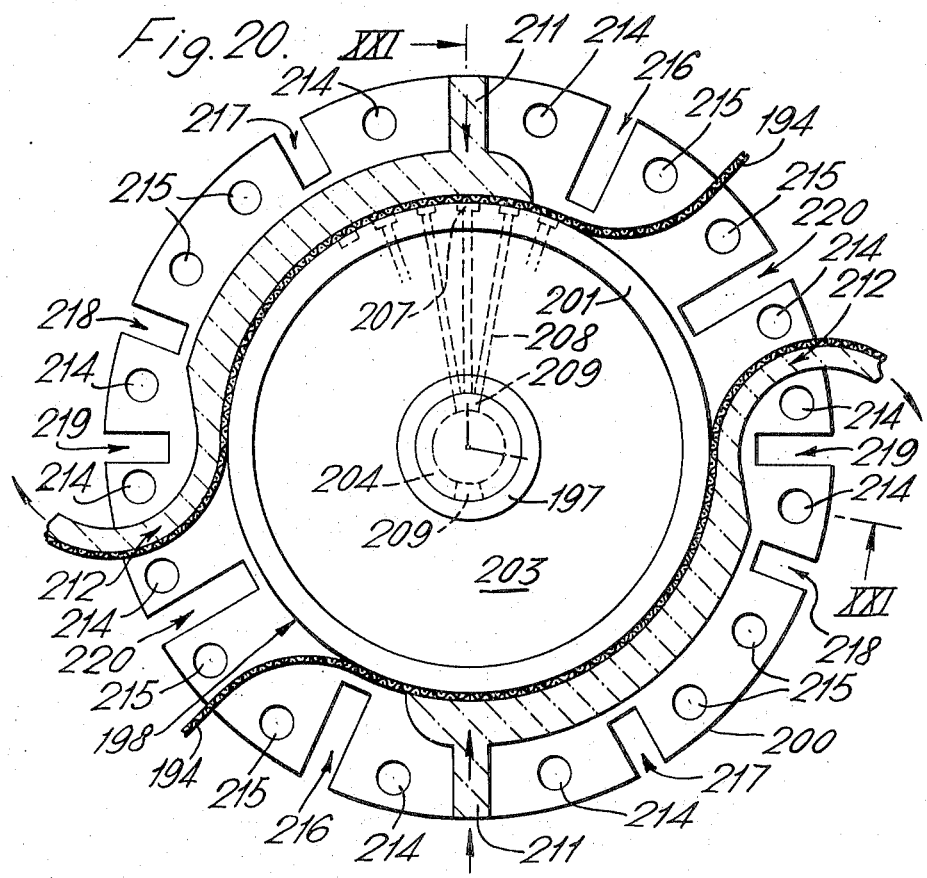

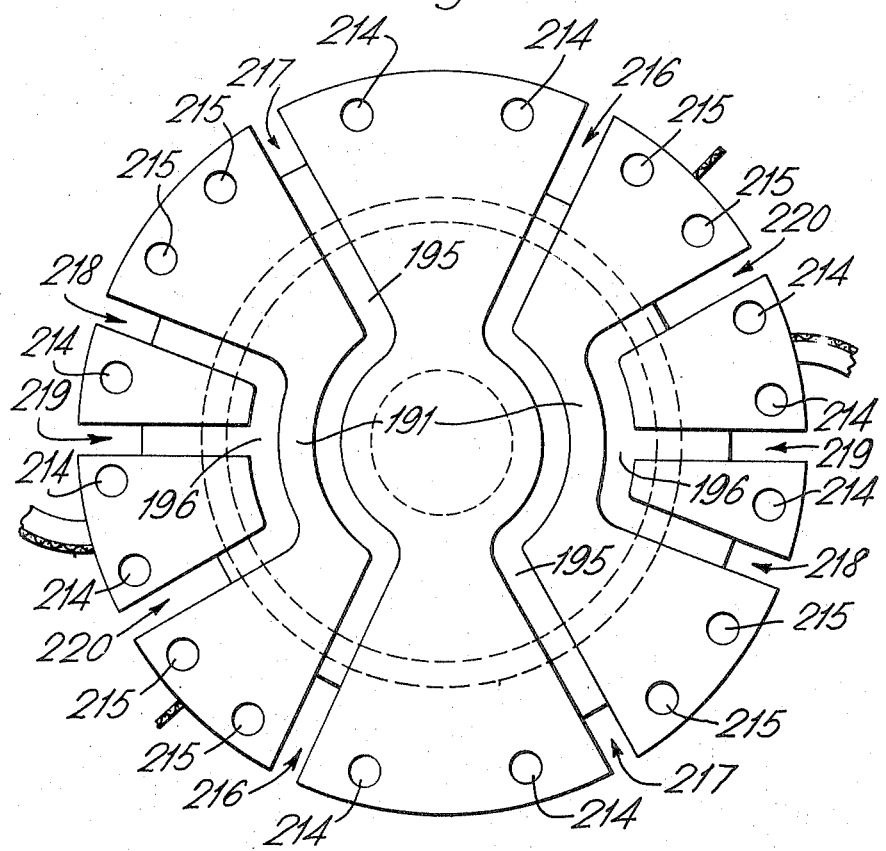

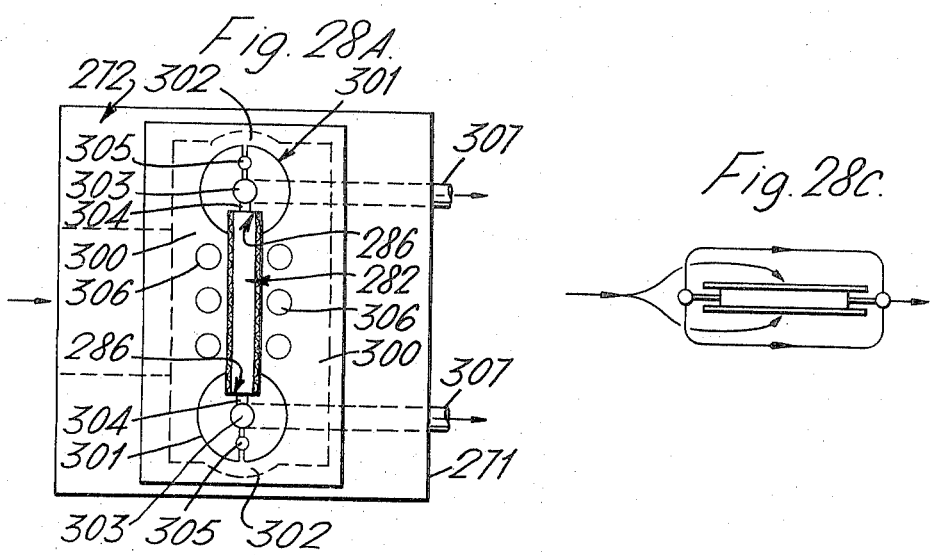
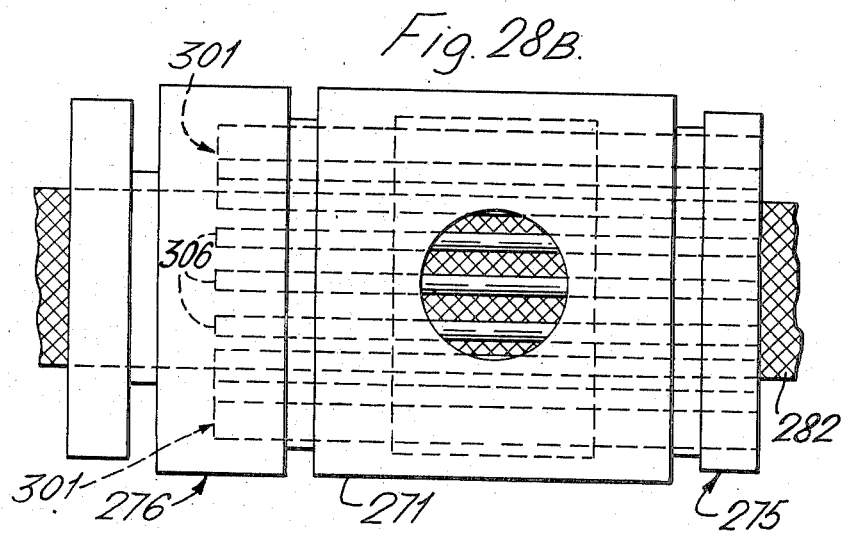
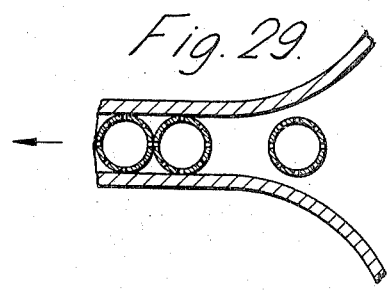

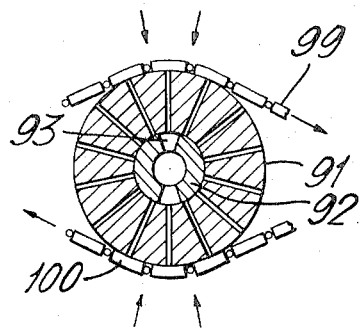
Fig. 39.
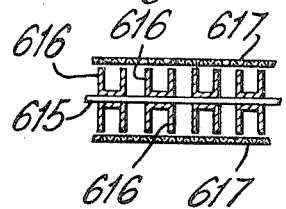
Fig. 40.
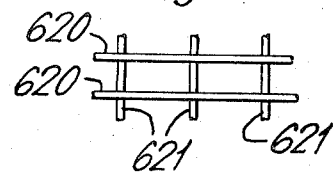
Fig. 41A. Fig. 41B.
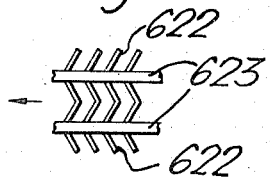
Fig. 42A.
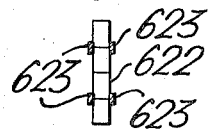
Fig. 42B.
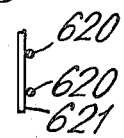
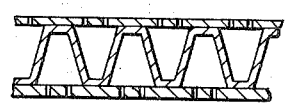
Fig. 43.
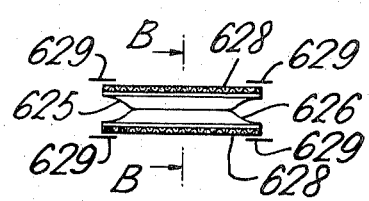
Fig. 44A.
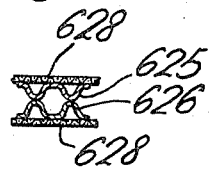
Fig. 44B.

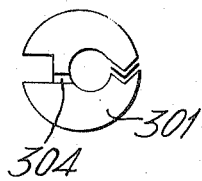
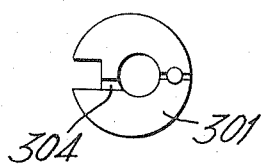
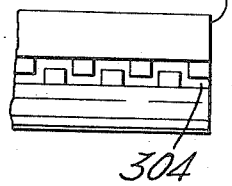
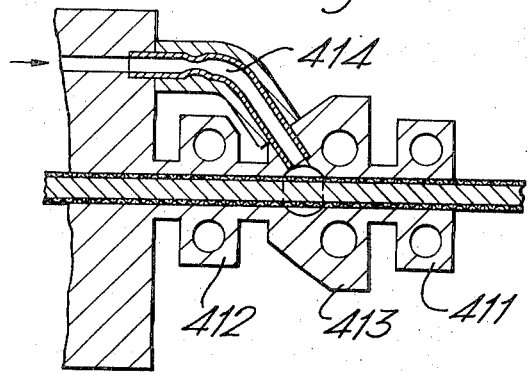
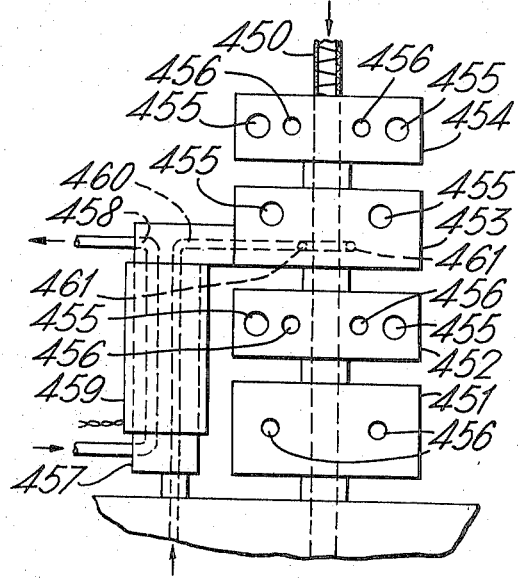

FILTERING PROCESS AND APPARATUS

This invention concerns improvements in or relating to filtering and in particular concerns improvements in filtering devices comprising a body defining a passage through which a substance to be filtered can be caused to flow and inlet and outlet ports flanking said passage through which a filter can be passed and moved to introduce different parts of said filter across said passage, said ports being adapted for the provision thereat, in use, of such temperature conditions as to enable the formation within said ports of sealing plugs of the substance being filtered or of another suitable sealing substance of adequate rigidity to prevent substantial leakage of the substance being filtered therefrom.

Filtering devices of the type outlined above are disclosed in my U.S. Pat. No. 3,471,017. It has been found in filtering devices of this type that, as the filter becomes progressively clogged with impurities filtered out of the stream of substance, the force exerted upon the active part of the filter as a result of the hydrostatic pressure of the substance being filtered can rise to such an extent that in some cases of heavy contamination it is only with some difficulty that the filter can be forwarded.

I have made several proposals for overcoming or at least substantially reducing the above mentioned problem. According to one proposal which forms the subject of my U.S. Pat. No. 3,645,399 an endless movable backing support (such as a rotary backing drum or an endless train of rollers for example) is provided for supporting the filter band or ribbon across the filtering passage with the backing support acting as a movable bearing for the filter. It is also proposed in Pat. No. 3,645,399 to arrange for a positive drive to be applied to the backing support (either by making it accessible to be driven mechanically or by judicious employment of the hydrostatic pressure of the substance being filtered as a forwarding drive) which enables the filter to be forwarded without itself having to be subjected to drive forces.

The invention disclosed in the above-mentioned U.S. Pat. No. 3,645,399 approached the problem of obtaining filter forwarding under difficult conditions firstly by providing a movable backing support for the filter and secondly by so arranging the filtering device that sufficient force can be applied to the backing support to enable it to be moved against the action of the forces which tend to prevent its ready movement. The present invention adopts an entirely different approach. In the arrangements disclosed in my U.S. Pat. Nos. 3,471,017 and 3,645,399 the forces which tend to prevent ready movement of the filter arise as the result of the (often considerable) hydrostatic pressure of the substance being filtered acting against a clogged filter band so that a high pressure differential exists across the filter band. This high pressure differential causes the filter band to press hard against its backing support thereby limiting the ability of the filter band to move relative to its backing support and, in the case wherein the backing support is itself movable, increasing friction in the backing support movement to such an extent as to prevent movement or at least make movement difficult. Whereas it is proposed in my U.S. Pat. No. 3,645,399 to make the backing support accessible to be driven by a force sufficient to overcome its resistance to movement, the present invention aims to reduce to an acceptable level the resistance to movement of the backing support by utilising a forcewise symmetrical arrangement in which forces applied to the backing support as the result of a hydrostatic pressure differential urging the filter band against the backing support are substantially cancelled or at least substantially reduced by oppositely directed forces or force components likewise applied to the backing support.

According to the present invention therefore there is provided a filtering device including a body defining a passage through which a substance to be filtered can be caused to flow, and slotted inlet and outlet ports flanking said passage through which at least one filter can be passed and moved to introduce different filter parts across said passage, said ports being adapted for the provision thereat, in use, of such temperature conditions as to result in the formation within said ports of sealing plugs of a flowable sealing substance of adequate rigidity to prevent substantial leakage of substance being filtered, the device further including a movable backing support for supporting said filter(s) within said passage, the said movable backing support being movable in the direction of movement of said filter(s) so that the support acts as a movable bearing for the filter(s), the filter(s) being so arranged relative to the backing support and the arrangement of the backing support being such that forces applied in use to the backing support as the result of a hydrostatic pressure differential across the filter(s) tend to cancel one another without awakening substantial reaction forces from stationary apparatus parts so that frictional drag is minimized when filter and backing support are moved simultaneously.

Various arrangements such as to obtain at least substantial equalization and mutual cancellation of the forces applied to the backing support by virtue of the hydrostatic pressure of the substance being filtered will be apparent. The backing support may for example comprise a cylindrical drum journalled for axial rotation and having openings in its circumferential curved surface for the purpose of admitting filtered substance which passes through a filter band or ribbon supported upon the said surface into extraction passages within the drum. With such a backing support, the arrangement may for example be such that a single filter band or ribbon is looped around the drum so as to be operative either throughout substantially the entire curved surface area of the drum or at least operative throughout defined surface areas of the drum which are so disposed relative to the rotational axis of the drum that hydrostatic forces applied thereto produce no, or at least substantially no, net force tending to restrict the ease of rotation of the drum. The cylindrical drum could be replaced by an equivalent train of rollers. To achieve the geometry required for hydrostatic force cancellation, the filter might for example enter and exit from the filtering passageway via in-line inlet and outlet ports, the filter being guided by means of suitably placed rollers to loop around and cover substantially the entire curved surface of the drum, or alternatively could be arranged for example to enter and leave the filtering passageway via inlet and outlet ports offset along the drum axis with the filter describing a single turn or a multiturn helical path around the drum. It will be noted however that the use of a helically wound filter ideally necessitates the use of a backing support capable of movement along the axis of the helix such as a composite toroidal annulus made up of spaced perforated discs. While, as outlined above, arrangements utilizing only a single filter band or ribbon are possible, it is generally more convenient to employ two or more filters associated with a single backing support arrangement, each filter being associated with and operative throughout an individually assigned filtering station established in the supporting surface of the backing support, and the filtering stations being so arranged relative to the backing support arrangement that the desired force cancellation is obtained or at least substantially obtained. In such an arrangement, means might be provided for cooperation with the backing support for establishing filtering stations corresponding to areas of the backing support whereat in use of the apparatus filtering can take place, the filtering stations being so arranged relative to the backing support and in consideration of the form of the backing support that hydrostatic forces applied thereto tend to cancel.

Where several filter bands or ribbons are used with a different filter band or ribbon being operative at each filtering station (e.g. with two filtering stations, two separate filter bands might be used, one for each station), separate inlet ports and outlet ports generally will be provided for admitting the filters to and extracting the filters from the filtering passage although, in one particular arrangement outlined below and described in more detail hereafter, it is arranged that the several filter ribbons pass through the same inlet and outlet ports.

The above-mentioned particular arrangement has two axially rotatable cylindrical backing drums arranged with their axes parallel and their curved surfaces in contact so that in use the two drums rotate in opposite directions at the same peripheral speed. Two filtering stations are provided one on each drum in a region centred on a line diametrically opposite the line of contact of the two drums, and the two filter bands or ribbons are arranged so that each serves a different filtering station. By this means, the direction of filter movement is the same at the two filtering stations so that a single inlet port and a single outlet port can be employed. The two drums need not be of the same size so long as the arrangement is such as to obtain at least substantial force balance.

For delimiting the above-mentioned filtering stations, it can be arranged that areas of the backing support whereat it is desired to prevent flow from taking place (i.e. areas other than the filtering stations) are mechanically masked by virtue of the construction of the apparatus. For example, with the backing support comprising an axially-rotatable cylindrical drum the circumferential curved surface of which constitutes the backing support surface for the filter and is apertured to permit flow of filtered substance therethrough, a non-rotatable masking member such as to overlie and obstruct the apertures of the surface of the backing drum and having openings defining the filtering stations may be provided. Alternatively, the masking member could be located within the backing drum so as to underlie the surface of the backing drum; in one such arrangement, the backing drum is formed as a hollow cylinder arranged to be rotatable upon a central core, and the central core itself constitutes the said masking member, the filtering stations being defined by the entrances to flow passages formed in the core for the extraction of filtered substance.

According to another arrangement such as to obtain at least substantial equalization and mutual concellation of forces applied to the backing support within the filtering passage, the backing support and one or more filter bands or ribbons are arranged to form a composite structure which is movable through the filtering passage subject on two or more opposed faces thereof to the pressure of the substance to be filtered, the backing support being adapted and arranged to receive only substance filtering through the filter(s) and to permit the flow of filtered substance received therewithin in a direction transverse to its flow through the filter(s) for extraction thereof from the filtering device, and the body of the device is arranged to permit substance to be filtered to approach said two or more opposed faces of said composite structure and furthermore is provided with one or more outlets for filtered substance in fluid flow communication with the backing support, means being provided to prevent flow of substance to be filtered directly into said outlets from the filtering passage.

By virtue of the arrangement of the filter(s) and backing support as a structure subject on two or more opposed faces thereof to the pressure of the substance to be filtered, it can be arranged that the greater part of the forces exerted upon the movable filter/backing support structure by the pressure of the substance being filtered cancel out so that, in the filtering passage, the only resistance to movement of the composite filter/backing support structure arises at the seals between it and the internal walls of the filtering passage.

In another preferred embodiment of this invention which is fully described hereinafter and is constructed in accordance with the abovementioned arrangement, the backing support is a closely corrugated metal band, the corugations of which extend transversely to the length of the band and thus transversely to the direction of movement of the backing support through the filtering passage. A composite filter/backing support structure as aforementioned is formed by sandwiching the corrugated metal band between two like filter bands so that the filter bands each rest upon the corrugations of the backing support and, when in use, are supported thereby. The filter bands may each comprise a band or ribbon of woven wire cloth. The filtering passage is constructed to admit substance to be filtered to both sides of the composite filter/backing support structure with the edges of the composite filter/backing support structure being sealed against internal walls of the filtering passage by means of spring metal sealing strips which, in use of the filtering device, are pressed against the composite filter/backing support structure by the hydrostatic pressure differential in the substance being filtered between unfiltered and filtered substance. Outlets for filtered substance communicate with the longitudinal edges of the composite filter/backing support structure to take off filtered material entering the corrugations in the corrugated metal backing support after passage through the filters. It will be appreciated that whilst both filters will, in use of the apparatus, be tightly pressed against the corrugated metal backing support, the forces they exert upon the backing support, being oppositely directed and substantially equal, will not hinder ready movement of the composite filter/backing support structure. The only resistance to movement arises through frictional drag between the edges of the composite filter/backing support structure and the metal strips, and this can be minimized by suitably forming the co-operating surfaces at the seals.

Whilst the above-described embodiment employs two like filter bands or ribbons, one on either side of the backing support, it will be appreciated that the two filter bands or ribbons need not be alike since, in use of the apparatus, differences between the two filters will be manifest as differences in the flow rates through the respective filters and the pressure differentials across the two filters will be the same. Not only need the two filters not be identical, but even one filter could be replaced by an impermeable member or, equivalently, the backing support provided with one impermeable surface. The filters themselves may be of woven wire construction, as mentioned above, and may be formed at a laminate of several (e.g. three for fine filtering) layers of different aperture sizes optionally containing a random or near random matrix of fibres, e.g. metal or glass fibres. Alternatively, the filters may be formed of sintered metal.

The backing support can take many forms in addition to that mentioned above, the requirement being for a means capable of supporting and holding separate the two filter bands or ribbons against the action of the hydrostatic pressure differentials across them in use, and providing a fluid flow facility for extractive flow of filtered substance. Thus, the backing support could for example be formed of coarse porous sintered metal, coarse woven wire mesh or welded metal grid, expanded metal sheet, etc. Alternatively, the backing support could be constituted by a plurality of transverse separator slats, which may be interconnected or may be independent of one another, each permitting filtered substance flow through one or more surfaces thereof and into internal flow passages adapted to communicate along the edges of the composite filter/backing support structure with the filtering device outlets. Such backing support slats could if desired be recovered at the spent filter outlet port of the device, cleaned and reused. According to one particularly convenient construction, the backing support and filters are formed together as a plurality of slats, each slat consisting of a hollow box element faced with sintered metal filters supported upon a permeable metal grid.

The composite filter/backing support structure is inevitably of considerably larger cross-sectional area as compared with the cross-section of a filter band per se and requires larger inlet and outlet ports to admit it to and exit it from the filtering passage. In consequence of the increased size of the inlet and outlet ports, the formation of thermal seals therein under some circumstances may not be so readily achieved, in particular where the nature of the backing support is such as to permit ready flow of filtered substance in the longitudinal direction of the backing support. In this case there may be a tendency for filtered material to flow back within the backing support towards and out of the inlet port of the filtering device. One way of avoiding this tendency is to so construct the backing support that, at spaced locations along its length, means are provided which prevent or restrict longitudinal flow of substance within the backing support. Alternatively and preferably, the backing support can be arranged to be impregnated with filtered substance of the type being filtered in the device when it enters the inlet port of the device, the already present substance in the backing support serving as sufficient hindrance to back flow of substance within the backing support from the filtering passage to enable ready formation of a sealing plug of solidified substance in the inlet port. The impregnation of the backing support can be effected beforehand so that the backing support enters the device already impregnated, in which case additives could also be introduced into the filtered substance by impregnation of the backing support, or alternatively a feed passage can be provided in the body of the device to bleed filtered substance from the filtering passage back to an impregnation station adjoining the inlet port.

Accordingly, another aspect of this invention provides a composite filter/backing support structure for use in the filtering of a substance in a filtering device according to this invention, the structure comprising a permeable backing support sandwiched between two filter bands or ribbons, or between a filter band or ribbon on one side and an impermeable member on the other side, and the interstices of the permeable backing support or of the entire composite structure being impregnated with said substance to be filtered and/or with an additive substance to be introduced into the filtered substance.

The tendency for filtered substance permeating into the backing support to flow longitudinally within the backing support could be turned to advantage. By utilizing such flow through the backing support as part of the filtered substance extraction process, the zone of extraction of filtered substance from the backing support may be removed from the active filtering zone thereby to make less onerous the task of the sealing to prevent incursion of unfiltered substance into extraction channels.

It will be appreciated that the filter bands or ribbons and, in the case of the above-described composite filter/backing support arrangement, the backing support need not necessarily enter the filtering device by way of the same inlet port. A separate inlet port could be provided for each of the several parts introduced into the filtering passage with the several said parts coming together within the filtering device.

In addition to the above described apparatus aspects, the present invention also extends to a process for filtering a substance flowing through a passage comprising the steps of introducing a filter by passing it through inlet and outlet ports flanking said passage so that a part of the filter extends across the passage, forcing the substance through the filter part in the passage to filter the substance, providing a flowable sealing substance in said inlet and outlet ports, maintaining temperature conditions at said inlet and outlet ports resulting in the formation therein of sealing plugs of said flowable sealing substance of adequate rigidity to prevent substantial leakage at said ports of the substance being filtered, supporting at least said part of the filter which extends across the passage by means of a movable backing support adapted to receive substance filtering through the filter, equalizing the force applied to the backing support as the result of a hydrostatic pressure differential across the filter urging the filter against the backing support by applying to the backing support a counteracting force thereby at least to reduce the net force tending to restrict the ease of movement of the backing support, effecting movement of said filter through said ports to introduce another part thereof into said passage under conditions providing for maintenance of the said sealing plugs, effecting movement of said backing support with said filter movement so that the backing support serves as a moving bearing for the filter, and extracting said filtered material received in the backing support.

It will furthermore be appreciated that, whereas the composite filter/backing support structure hereto discussed has been formed by bringing together one or more filters proper and a backing support thereof, an equivalent structure could be integrally formed. Thus according to yet another aspect of this invention there is provided a filtering device including a body defining a chamber into which a substance to be filtered can be caused to flow, inlet and outlet ports flanking the chamber through which a filter structure is introduced into the chamber so as, in use of the device, to be subject on opposed surfaces thereof to the pressure of substance to be filtered, said filter structure being movable to introduce different filter parts into the chamber, means for providing temperature conditions at the ports for the formation therein, in use, of sealing plugs of a flowable sealing substance of adequate rigidity to prevent substantial leakage of substance being filtered from the ports, said filter structure having an interior adapted and arranged to receive only substance filtering through said filter structure and to permit the flow of filtered substance within the said interior for extraction thereof from the filtering device, at least one outlet for filtered substance in fluid flow communication with said interior of the filter structure and means preventing flow of substance to be filtered directly into said at least one outlet from the said chamber.

Also disclosed herein are systems incorporating filtering devices preferably of the forcewise balanced type with which this invention is concerned although filtering devices of the general type disclosed and claimed in my U.S. Pat. No. 3,471,017 or any other type of filtering device could be used, and concerned primarily, though not exclusively, with the problems of ensuring a continuously finely-controlled supply of raw material to spinnerets in the manufacture of synthetic fibres. The problem posed here is that the very high degree of uniformity required regarding the pressure, th temperature and the amount of polymeric raw material delivered per unit time to the spinnerets is not easily achieved with very fine filtering since all filters sufficiently fine to be conveniently used tend to clog up rapidly. The systems to be described aim at solving or at least reducing this problem by providing a control system capable of continuously stabilizing all the variables and incorporating a movable filter for the removal of contaminants. Particularly when filtering devices as claimed in my U.S. Pat. No. 3,471,017 are operated in a mode in which filter forwarding is discontinuous, undesirable variations can occur in the flow of filtered material from the filtering device as the result of progressive clogging of the filter. Also supply pressure fluctuation can cause undesired variations in flow pattern. In order to smooth out such variations, it is proposed to employ a substantially non-resilient diaphragm or bellows member immersed within a fluid-filled enclosure the temperature and pressure of which are precisely determined and maintained as required in the process by any suitable means. The interior or captured volume of the diaphragm or bellows member communicates with the outlet of the filtering device to accept filtered substance therefrom so that the diaphragm or bellows is continuously filled with substance passing through to the spinnerets. By virtue of the non-resilience of the diaphragm or bellows member and the maintenance of the pressure in the enclosure at a precisely constant level, fluctuations in the supply of filtered material to the diaphragm or bellows member will be accompanied by changes in the captured volume of the diaphragm or bellows member without pressure changes since the pressure within the enclosure remains that prescribed. For determining the pressure within the enclosure, the enclosure may for example be arranged to communicate with a chamber within which the pressure is determined by a piston which is loaded with a suitable weight or by means of a suitable constant-tension spring. The position of the piston may be sensed by any convenient sensor and arranged, by means of a control loop, to control (for example by controlling the rate of filter movement and thereby its clogging) the supply of material passing to or through the filtering device thereby to ensure that changes in the captured volume of the diaphragm or bellows member do not drive the piston to the limit of its movement which would cause the system function to fail.

Advantageously, the bellows member within the enclosure can be arranged to deliver the flow of substance passing through it to the spinnerets by way of a relatively long capillary also contained within the enclosure and preferably provided with heat-exchanging fins by virtue of which the temperature of the filtered substance within the capillary is determined to be that of the enclosure. By virtue of the provision of the capillary, any residual fluctuations in the pressure of material emerging from the bellows member, caused for example by failure of the loaded piston to respond instantaneously to volume changes of the bellows member by virtue of its inertia, will be damped. As an alternative to the capillary which serves the two functions of providing hydrostatic damping and temperature equalisation between the fluid in the enclosure and the material flowing in the capillary, separate devices could be provided for performing the two functions separately; viz. for providing hydrostatic damping any suitable restrictor could be used, and for obtaining temperature equalisation any suitable heat exchanger could be used. It will be appreciated that by controlling the temperature and pressure of the filtered substance supplied to the spinnerets, the above system also ensures delivery of the desired volumetric flow of substance to the spinnerets.

Broadly stated, the above described system thus comprises, in combination, a filtering device of the type disclosed herein or of any other convenient type and, connected to the outlet thereof, a substantially non-resilient diaphragm or bellows member within a fluid-filled enclosure the temperature and pressure within which are precisely prescribed, the arrangement being such that fluctuation in the supply of filtered material to the diaphragm or bellows member will be accompanied by changes in the captured volume of the diaphragm or bellows member whilst the pressure therewithin remains that prescribed for the enclosure, and the system outlet being taken from the diaphragm or bellows member.

In a more simple system intended for lower pressure operation, the enclosure is open to the atmosphere and the pressurisation of the diaphragm or bellows member is by means of a constraining spring. In such an arrangement, increased dependence is made upon the provision of a following capillary for acceptable control.

Another system which is similar to the above-described systems, provides a measure of the volume of substance supplied which enables control of this to be effected more directly. Two non-resilient diaphragms or bellows members each contained in a separate temperature-controlled enclosure and each having an associated capillary are connected in series so that the capillary associated with the first bellows member leads into the second bellows member, its capillary communicating with the system output. The two enclosures are independently temperature controlled and each communicates with a spring loaded piston in a pressure chamber. By virtue of the flow-restricting capillary between the two bellows members, the pressures in the two bellows members will differ by an amount which is dependent upon the controlled temperature of the substance within the said capillary and upon the rate of flow of substance through the system, and this pressure differential can readily be sensed and utilised for control purposes.

In order that the invention might be well understood various embodiments thereof will now be described by way of example only with reference to the accompanying drawings wherein:

FIGS. 4A, 4B and 4C illustrate the aforementioned particular arrangement wherein two filter bands or ribbons are employed and the two filters enter and leave the filtering passageway respectively via a single inlet port and a single outlet port, FIGS. 4B and 4C showing alternative mounting arrangements;

FIG. 4D illustrates schematically a linear arrangement developed from the rotary arrangement of FIGS. 4A, 4B and 4C;

FIG. 5 shows a sectional top plan view of an embodiment of the invention which employs a plurality of backing supports;

FIG. 6 shows a sectional side elevational view taken on the line VI — VI in FIG. 5, the line V — V on which the sectional view of FIG. 5 is taken also being shown;

FIGS. 17, 18 and 19 illustrate different sealing arrangements suitable for use in an embodiment similar to that of FIGS. 13 to 16;

FIG. 20 shows a sectional top plan view of an embodiment wherein the inlet and exit ports are integrally formed and filter forwarding is achieved or assisted by virtue of the hydrostatic pressure of the substance being filtered tending to extrude the sealing plugs in the outlet ports and thereby exerting a torque on the filter support;

FIG. 22 shows a top plan view of the embodiment of FIGS. 20 and 21;

FIGS. 28A and 28B show a second composite filter/backing support embodiment of the invention in end elevational and top plan views respectively, this embodiment having a different arrangement of the composite filter/backing support edge sealing means from that shown in the embodiment of FIGS. 27A, 27B and 27C, FIG. 28C shows a modified form of the embodiment of FIGS. 2A and 2B;

FIGS. 29 to 56 show various composite filter/backing support structures;

Figure 69:
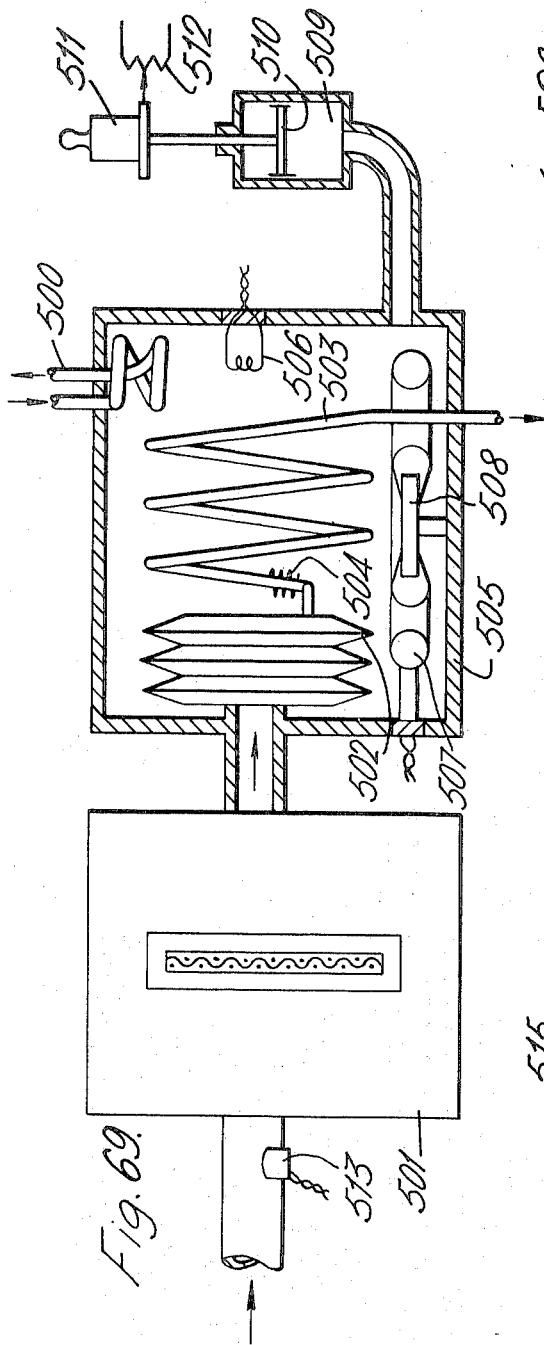
Figure 71:
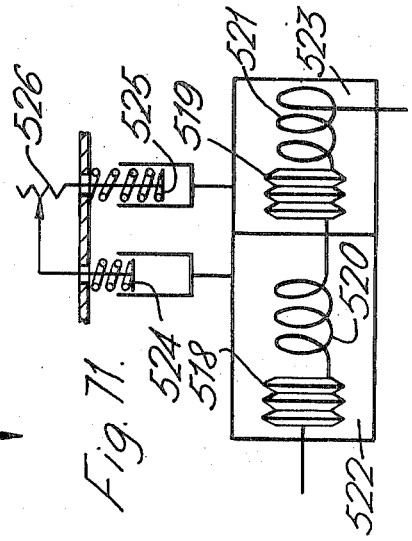
Figure 70:
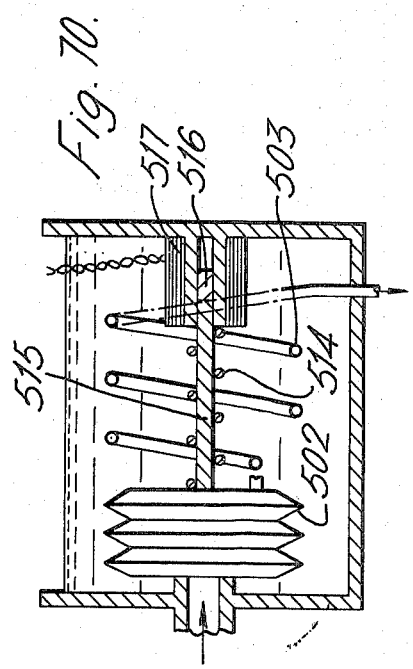

FIGS. 57 to 66 shoe various edge sealing arrangements for the composite filter/backing support structure in the filtering passage;

FIG. 67 shows an arrangement for bleeding filtered substance from the filtering zone to impregnate the backing support within the inlet port;

FIG. 68 shows an alternative to the arrangement of FIG. 67;

FIG. 69 illustrates a control system incorporating a filtering device (for example according to the present invention) and intended particularly though not exclusively for controlling the supply of raw material to spinnerets in the manufacture of synthetic fibres;

FIG. 70 illustrates a modification of the system of FIG. 69 designed for lower pressure operation; and FIG. 71 illustrates a control system similar to those of FIGS. 69 and 70 but arranged to control the volumetric flow of raw material rather than to control the pressure of the raw material supply.

Figure 1:
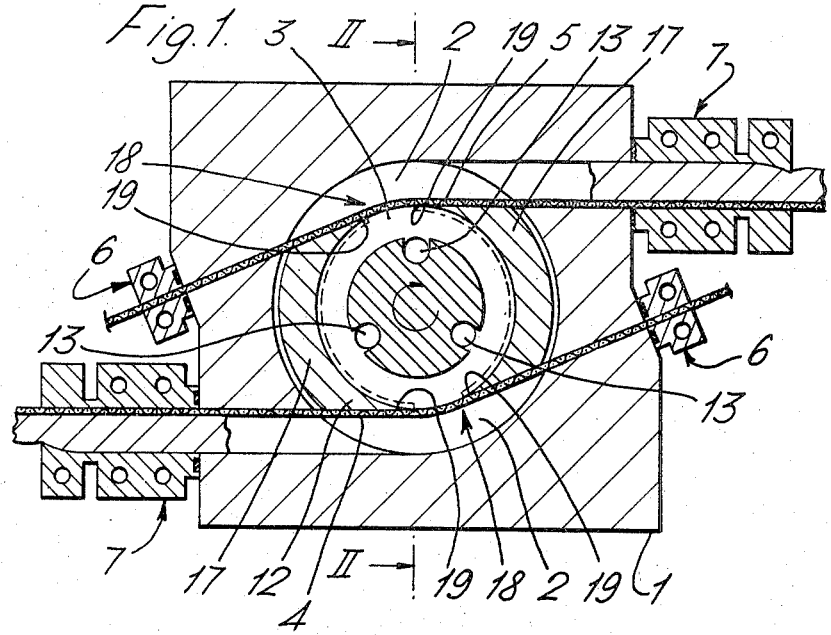
FIG. 1 shows a sectional top-plan view of a first exemplary embodiment of the invention.
Figure 2:
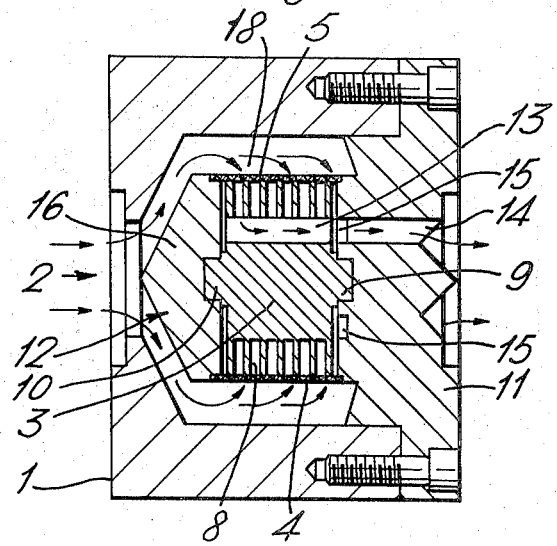
FIG. 2 shows a sectional side elevational view of the embodiment of FIG. 1 taken on the line II — II in FIG. 1.

Referring first to FIGS. 1 and 2, which show a simple embodiment of the invention in top plan and side elevation sectional views respectively, the filtering device shown consists of a body 1 defining a passage 2 through which a substance to be filtered can be caused to flow and a rotatable filter support 3 mounted in the passage 2 for supporting filter bands 4 and 5 which enter and leave the body via slotted inlet and outlet ports 6 and 7 respectively which are of the type described in my U.S. Pat. No. 3,471,017. As can be seen, the arrangement of the support 3 in the passage 2 is such that, whilst the throughput of substance through the device is generally axial in relation to the axis of rotation of the support 3, filtration of the substance is in the radial direction; the arrows drawn in FIG. 2 in the passage 2 show the flow path of substance through the device. Body 1 would, in use, be kept at processing temperature by heating means, not shown.

The filter support 3 is mounted in a cylindrical bore in the body 1 which defines the filtering passage 2 and comprises a stainless steel cylinder machined as shown to divide its circumferential periphery into a number of axially spaced fins or plates 8 and to form journals 9 and 10 which are received respectively in bearings (which can be plain journal bearings and may be slotted or otherwise formed to permit a cleansing flow of filtered substance therethrough) formed in body end piece 11 and in a member 12 which serves (as described more fully below) to delimit filtering stations. The plates 8 serve to support the filters 4 and 5 at their peripheries as shown, and the spaces between the plates 8 serve to admit substance passed through the filters to distribution apertures 13 formed through the filter support 3 and communicating with outlet apertures 14 in the body end piece 11 (see FIG. 2) via an annular groove 15 in body end piece 11. Although shown flat in FIG. 2, plates 8 may be dished to give improved flow characteristics.

The member 12 has a conical end portion 16 which serves to deflect substance entering the filtering passage 2 towards the circumferential surface of the filter support 3 and is cross-sectionally shaped as shown most clearly in FIG. 1 so that the portions 17 thereof, situated within the filtering passage 2, delimit filtration zones 18 around the periphery of support 3. The member 12 is thus generally U-shaped, with the legs of the U constituted by the portions 17 and the base constituted by the conical end portion 16, and straddles the filter support member 3. The member 12 is fixed in the filtering passage 2 formed in the body 1 in any convenient manner (side members 17 may be affixed to body 1, made integral with it or as in the embodiment shown in FIG. 2 spaced from it). The portions 17 delimit the filtration zones 18 between their edges 19, the regions of the filter bands 4 and 5 which bear against the solid parts of the member 12 as shown taking no part in the filtering of the substance in passage 2. It will be seen that the two filtering zones 18 are spaced diametrically opposite one another with respect to the axis of rotation of the filter support 3.

In use of the device illustrated in FIGS. 1 and 2 substantially equal and opposite forces will be applied to the filter support 3 as the result of the pressure differential across the filter bands 4 and 5 at the respective filtration zones 18, and no significant resultant forces will occur such as to limit to any significant extent the ease of rotation of the filter support 3.

When a filtering device in accordance with FIG. 1 is used for filtering heavily contaminated material, coarse filters of substantial rigidity are preferred which show little tendency to deflect into spaces between the plates 8 of support 3. When filters of intermediate rigidity are required which show a moderate tendency to deflect under the substantial pressure differential existing across the filter at filtering stations 18, this may be counteracted by filling the spaces between the plates 8 of support 3 with coarse sintered steel or a like supporting substance with little flow resistance and by providing only a small clearance between the rotating support 3 and edges 19 of side members 17. Alternatively, the circumferential supporting surface of the rotary support 3 may be sheathed with a coarse backing filter affixed to the perimeters of the plates 8 and extending across the spaces between the plates. When a filtering device in accordance with FIG. 1 is used for fine filtering, for example for the filtration of polyesters preceding spinning, fine filters of small rigidity are the most readily available and these tend to deflect into the clearance between support 3 and the edges 19 of side members 17. This tendency may be overcome by grooving the inner surfaces of the side members 17 in the planes of the plates 8 as shown by broken lines in FIG. 1 so as to provide curved protrusions situated between the plates 8 which act as take-off fingers at the gaps between edges 19 and support 3. In this case support 3 and member 12 interpenetrate and one or the other must be assembled from component parts fastened together. In cases when the filter is too fragile for any of these methods of supporting, a composite laminated filter may be employed having two or more layers. These may consist of a fine upper layer supported on a coarse but rigid supporting layer such as coarse woven wire cloth. The latter may be passed through the device together with the fine filter or it may form a continuous loop contained wholly within and passing through the channel between body 1 and side members 17 which is invisible in FIG. 1.

Figure 2A:
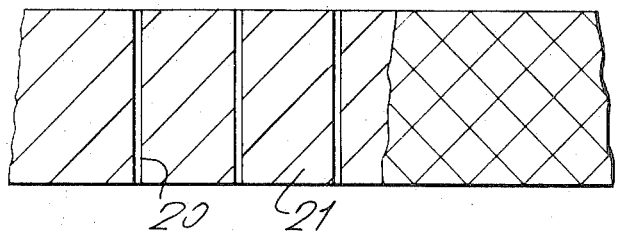
FIGS. 2A, 2B and 2C illustrate special constructions of filter band or ribbon suitable for use in the embodiment of FIGS. 1 and 2 for filtering different substances having differently sized contaminants.
Figure 2B:
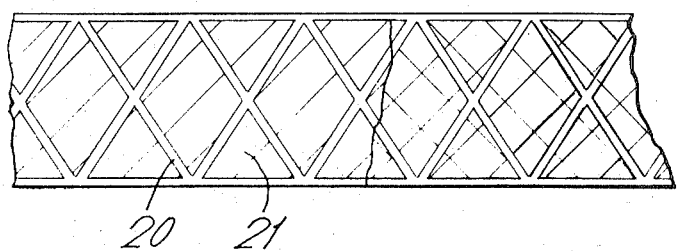

When a composite laminated filter of the above-mentioned type is used, it becomes necessary to limit undesirable transverse flow of substance along the filter within the coarse supporting structure and along the faces of side members 17 on which this structure slides. For this purpose there may be provided regions in the supporting structure which do not permit transverse flow and hence delimit the filtering portions of the filter itself. As shown in FIG. 2A, dividing walls 20 may be formed in supporting filter 21 by seamwelding, plasma arc welding, brazing or impregnation with any suitable substance impervious to the material which is to be filtered and these walls 20 act as barriers to flow in the plane of the filter. It will be clear that these barriers may also serve the purpose of fastening together some or all of the layers which constitute the composite laminated filter and that they may be inclined at any suitable angle to the edges of the filter. A multiply seamwelded or "quilted" type of structure is shown in FIG. 2B having also an optional weld at the edges. Another filter structure with the desired characteristics for very fine filtering may comprise a support member consisting of a perforated steel band 22 shown in FIG. 2C supporting a fine upper filtering layer 23; discrete filtering zones are formed at every perforation permitting negligible flow between neighbouring zones. It will be clear that the fine layer 23 need not be continuous between the filtering zones and that an extended filter consisting of a plurality of discrete filtering zones may also be utilised. In those cases when filtering in depth is required, for example where impurities occur in both coarse and fine particle sizes, an outermost filter 24 may be added; this will be generally coarser than the fine filter 23 and is found to assist also in protecting the fine filter 23 during its passage through the inlet and exit ports 6 and 7 in FIG. 1. Although economic considerations often preclude it, it will be clear that any number of filters may be laminated together to form a composite filter for use in the filtering devices described herein.

Figure 2C:
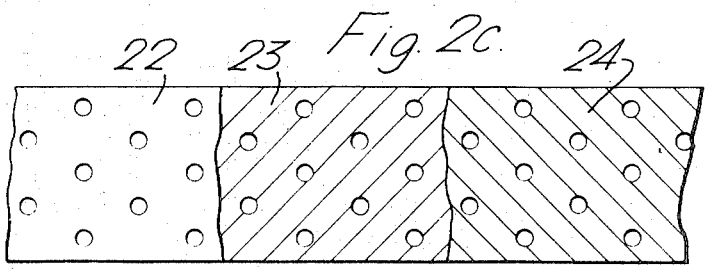

As alternatives to the filter structures shown in FIGS. 2A, 2B and 2C, a structure could be used comprising two or more wire cloth filters interwoven to form a single entity.

Figure 3:
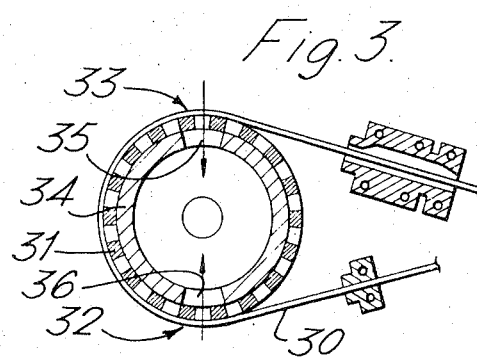
FIG. 3 is a schematic view illustrating the use of a single filter band or ribbon looped around the backing support so as to be operative at two diametrically opposed filtering stations.

FIG. 3 illustrates schematically an alternative embodiment of the invention which differs from that shown in FIGS. 1 and 2 in that only one filter band is employed, the single filter band 30 being looped around the filter support drum 31 as shown. As in the embodiment of FIGS. 1 and 2, diametrically opposed filtration zones 32 and 33 are defined in relation to the cylindrical surface of the filter support drum 31 and forces applied to the drum as a result of a hydrostatic pressure differential across the filter band at the zones 32 and 33 in use of the device tend to cancel. However, the way in which the filtration zones 32 and 33 are defined differs from the embodiment of FIGS. 1 and 2; in the FIG. 3 embodiment, the filter support drum 31 is in the form of a hollow perforated cylinder mounted for rotation upon an inner cylindrical structure 34 which, apart from openings 35 and 36, is imperforate and is non-rotatable. The inner structure 34 thus acts as a masking member to close the perforations in the filter support drum 31 in all regions thereof except where the openings 35 and 36 in the structure 34 underlie the filter support drum 31. It will be appreciated that the filter band part used at filtration zone 33, having already been used at zone 32, will be more contaminated, but although generally different flow intensities obtain at the two zones this does not result in there being a greater pressure differential across the filter at zone 33 than at zone 32 because the pressure equalises within the structure 34 and it equalises also, at a higher value, outside the filter support drum 31. Various parts of the device of FIG. 3 have been omitted from the drawings, but it is felt that the drawing is sufficient to disclose the principle involved.

Figure 3A:
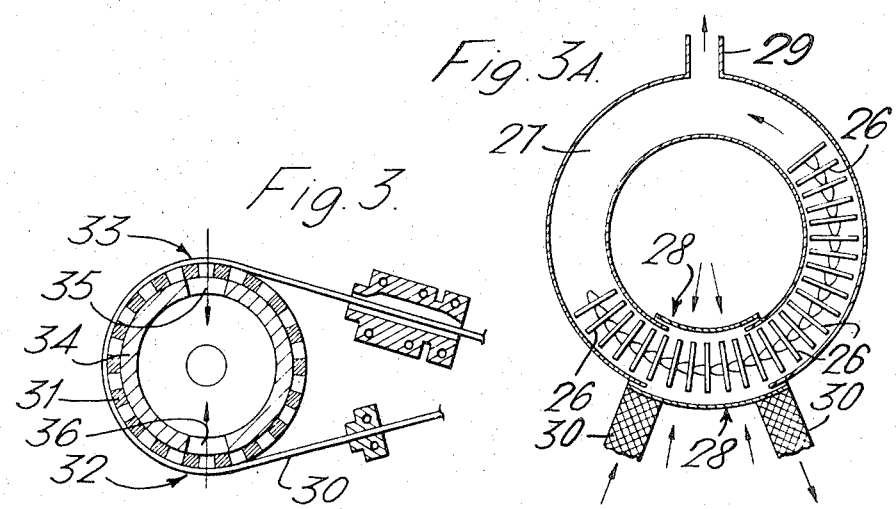
FIG. 3A is a schematic view showing a single continuous filter band helically wound around a backing support in the form of a toroidal annulus constructed to be capable of movement in the direction of the axis of the helix formed by the filter.

FIG. 3A shows schematically an alternative looped filter arrangement in which the filter described a multi-turn helical path around a backing support in the form of a toroidal annulus designed to serve as a movable bearing for the filter by permitting movement both in the longitudinal direction of the filter and in the axial direction of the helix described by the filter. As shown in FIG. 3A, the backing support comprises a plurality of spaced perforated discs 26 located within an annular passage 27 formed in the body of the device, the discs 26 being arranged for movement around the passage 27 whilst maintaining their dispositions relative to each other. The discs 26 could be replaced by a helical spring located within the passage 27. The passage 27 has an open inlet portion 28 underlying the filter where it loops helically around the backing support, the open inlet portion serving to admit filtered substance permeating through the filter into the interior of the passage, and is formed with an oulet 29 for filtered substance. As in the embodiment of FIG. 3, the filter band in the embodiment of FIG. 3A is designated 30.

FIG. 4A shows an embodiment which corresponds to the aforementioned particular arrangement and differs from the previous embodiments primarily in that it employs two rotary filter supports 41 and 42 and the two filter bands 43 and 44 enter and leave the filtering passageway via the same inlet and outlet ports 47 and 48 respectively and are each guided through rollers 45 and entrained around a respective one of the rotary filter supports. The positioning of the axes of rotation of the filter supports 41 and 42, which are of the hollow drum type illustrated in FIG. 3, permits each filter support a degree of movement towards and away from the other filter support by virtue of the arrangement shown in FIG. 4B and described below which is designed to counter any tendency of the hollow cylindrical drums 41 and 42 to deform out of their circular cross-section. With more substantial solid backing drums a simple floating mounting of the drums as shown schematically in FIG. 4C is possible wherein each drum is formed with a slot within which is slidingly received a fixed shaft which finds its own balance position within the slot. The adjacent surfaces of the two supports are in contact at 46 for the purpose of equalising the forces acting thereupon. This embodiment readily permits half or more of the periphery of each drum to be utilised as a filtering zone. FIG. 4B shows details of the coupling device schematically indicated in FIG. 4A employed for ensuring that drums 41 and 42 turn substantially free of load. Freely floating frame 37 draws together the reduced ends of respective hollow inner drum members 38, the flats shown preventing rotation. The compression and hence the force at contact point 46 between the outer drums is set by compressing the respective stacks of dished disc springs 39 by means of a screw bearing upon washer 40 and is adjusted according to the magnitude of the pressure drop across the screens to ensure that not only is the combination of the two drums in a state of force equalization, but also each drum is in a state of force equalization relative to its rotational axis. It will be clear that drums 41 and 42 could be geared together to supplement their frictional synchronism.

The arrangement of FIG. 4A demonstrates the concept of countering the forces developed upon one backing support associated with one filter band or ribbon with oppositely directed forces developed upon another backing support associated with a different filter band or ribbon. This concept is not limited to FIG. 4A for example, by interposing an idler roller between the two backing support drums in FIG. 4A there would result an arrangement akin to a linear arrangement (as opposed to a rotary arrangement) in which the two backing drums were replaced by a parallel arrangement of two perforated backing plates supported for translational movement by means of at least two idler rollers disposed between the plates and each supporting both plates. Such an arrangement is schematically illustrated in FIG. 4D. An equivalent arrangement using racks and pinions could be constructed.

FIGS. 5 and 6 show an embodiment which employs four rotary backing supports 51, 52, 53 and 54 arranged in a linear array and two filter bands 55 and 56 disposed one on either side of the array. The backing supports are perforated hollow cylindrical drums journalled as shown most clearly in FIG. 6 to be axially rotatable, and the flow of substance is radially through the filter bands into the drums and thence axially via apertures formed in the journals at one end of the drums and into an outlet passageway 57 formed in the obdy of the device. As with the previously described embodiments, filtration zones are defined for each backing support by the body parts 58 between adjoining backing supports, and for each rotary backing support two filtering zones diametrically opposite one another are provided for force equalisation. The drums 51 to 54 could be replaced by stiff helical springs.

Figure 7:
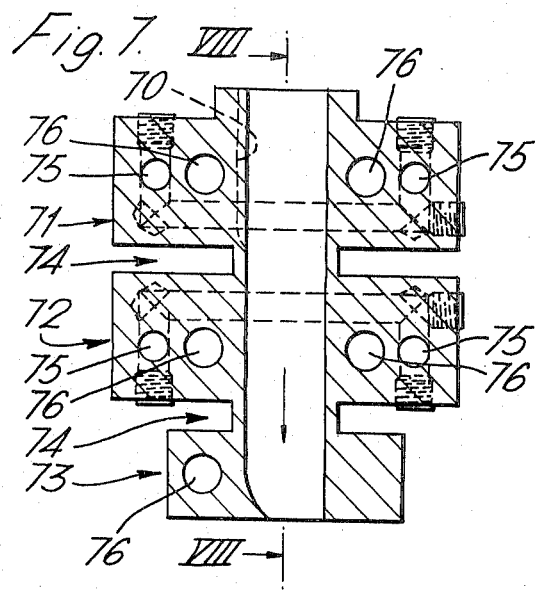
FIG. 7 shows a sectional plan view of a form of outlet port which is of specific advantage in connection with the filtration of polymers having high frictional coefficients.
Figure 8:
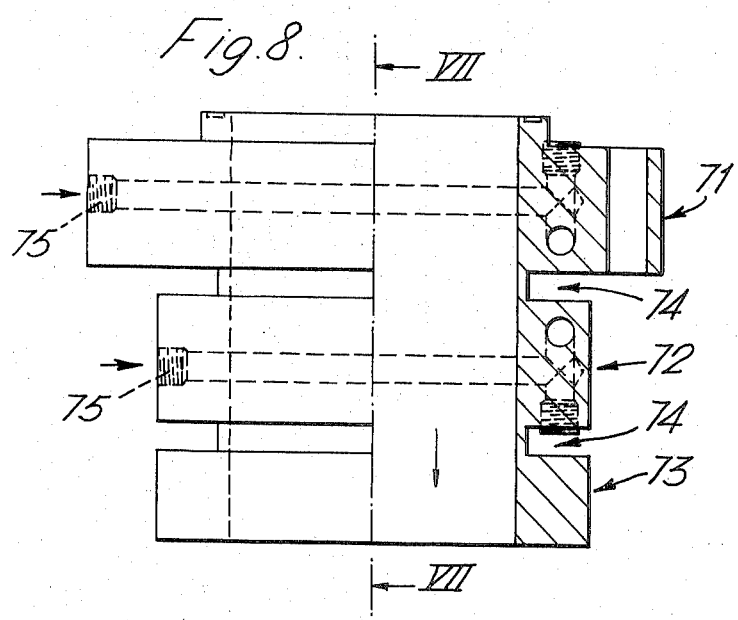
FIG. 8 is a part-sectional side elevational view on the line VIII — VIII in FIG. 7 and showing the line VII — VII on which the sectional view of FIG. 7 is taken.

FIGS. 7 and 8 show a form of outlet, suitable, for example, for use as a replacement for the exit ports 7 in FIG. 1, having special advantages in relation to the filtering of polymers having high frictional coefficients and, in particular, polymers which in addition exhibit negligible shrinkage or even positive expansion on solidification, e.g. polystyrene foam (produced for example by the pentane injection process). With such polymers, the progressive solidification required to produce efficient sealing plugs in the inlet and outlet ports through which the filter band enters and exits from the filtering passage would, in the conventional ports (especially the outlet port) as exemplified in my U.S. Pat. No. 3,471,017, cause a progressive setting up of stresses in the continuously forming sealing plugs which, being transmitted to the adjoining walls of the port, might result in the plug binding firmly in the port and, owing to the high frictional coefficient of the material, preventing forwarding movement of the sealing plugs and of the filter band. The port shown in FIGS. 7 and 8 is formed with three sections 71, 72 and 73 which are thermally insulated from one another by the reduced thicknesses at necking portions 74. The sections 71 and 72 are each provided with both coolant flow channels 75 and electrically-operated heaters 76 in order to achieve a desired functional heating and cooling cycle as detailed below. The outermost section 73 has provision only for heating which will be effected intermittently as explained below.

In operation of the illustrated outlet port, the aim is to utilize the innermost section 71 for forming a highly-stressed barrier plug which will prevent leakage from the port and will not permit forwarding movement of the filter band or ribbon and, while the barrier plug is maintained, to form in the middle and outer sections 72 and 73 respectively a substantially unstressed sealing plug which can then be controllably extruded from the outlet port for advancing the filter, the controlled extrusion taking place after dissolution of the barrier plug in innermost section 71. Assuming that a filter forwarding operation has just taken place and that the substance in innermost section 71 and, say, in half of middle section 72 is hot and liquid and the remainder of the outlet port contains a solid sealing plug, the following sequence of operations must be performed before the next filter forwarding operation. Firstly, the innermost section 71 is cooled so that a stressed barrier plug is formed therein by virtue of the substance solidifying under the hydrostatic pressure of the substance to be filtered flowing in the filtering passage. Secondly, with the barrier plug maintained in the innermost section 71, the middle and outermost sections 72 and 73 respectively are heated so that the substance therein relaxes from a stressed to a substantially unstressed state. During this second stage, there will be no movement of the filter band or ribbon since it is held firmly by the stressed barrier plug in the innermost section 71. The next stage is to cool again the middle and outermost sections 72 and 73 respectively so forming therein a substantially unstressed sealing plug which, while fitting closely within the respective port sections and constituting an effective seal, does not bear against the internal walls of the port in the manner of the barrier plug in the innermost section 71. In the following stage of the process, the innermost section 71 is heated so that the barrier plug therein relaxes its grip whereupon the sealing of the outlet port becomes wholly dependent upon the unstressed sealing plug in sections 72 and 73, and forwarding of the filter band or ribbon can be obtained by heating the outermost section 73 to enable the plug to be extruded from the port under the force exerted upon it by the hydrostatic pressure of the substance being filtered, the extent of filter forwarding being determined by control of the heating of outermost section 73 in the usual manner. Having forwarded the filter the required amount, the process is repeated starting with the cooling of the innermost section 71 to form another barrier plug. The outlet port of FIGS. 7 and 8 thus operates on the basis of forming a stressed barrier plug and maintaining it whilst relaxing the stresses in the substance filling the remaining parts of the port, forming a substantially unstressed plug from the relaxed substances, and then melting the stressed barrier plug to enable the unstressed plug to be moved.

It will be noted that the outlet port of FIGS. 7 and 8 has a narrowed section at its outermost extremity; in certain circumstances it is advantageous to widen the interior of the outlet port as shown by the dashed line 70 in FIG. 7 in the region of the portion 71 thereof and arrange that it joins the next narrower portion 72 at a curved step similar to that shown at the port extremity. Such a widening of the interior of portion 71 ensures that a sealing plug formed in this portion cannot move at a time when the portion 72 is being heated to relax stresses in the outlet sealing plug, and is useful where the material being filtered does not exhibit a sufficiently high frictional coefficient to always guarantee the immobility of a stressed, parallel-walled barrier plug.

Figure 9:
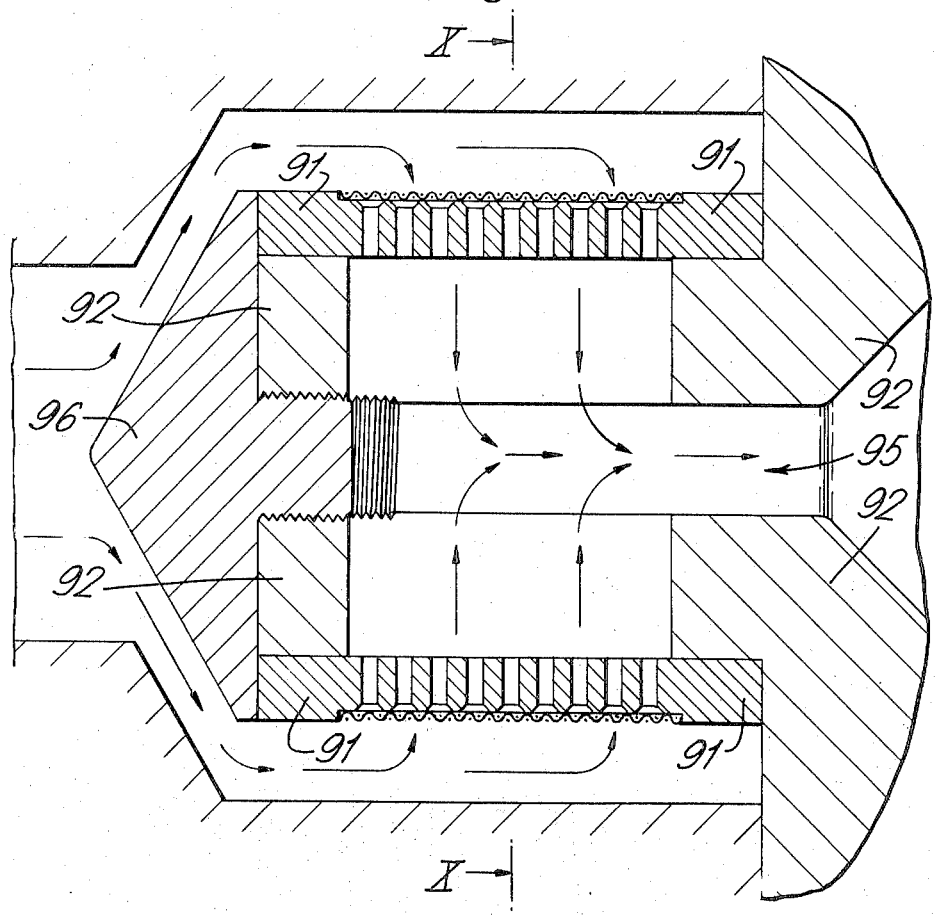
FIG. 9 shows a sectional side elevational view of part of yet another embodiment of the invention.
Figure 10:
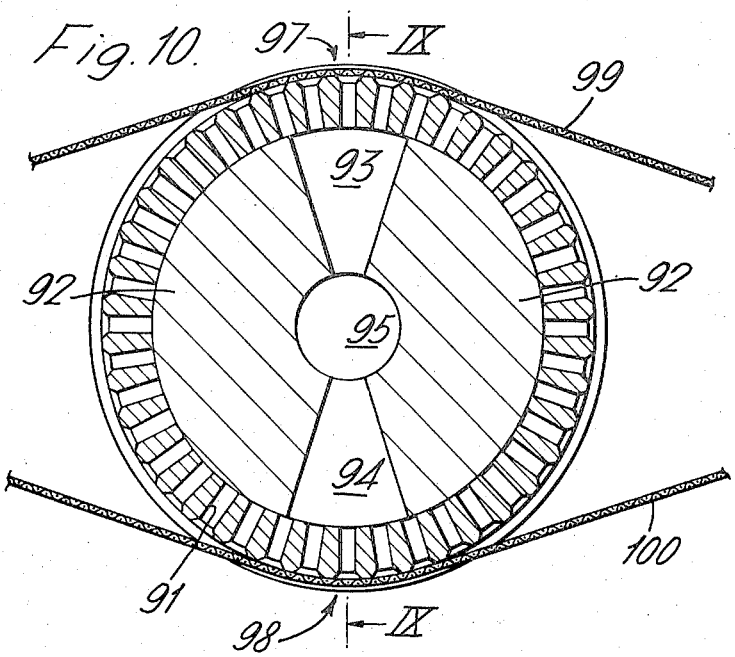
FIG. 10 shows a sectional view taken on the line X — X in FIG. 9 and showing the line IX — IX on which the sectional view of FIG. 9 is taken.

FIGS. 9 and 10 show another embodiment of the invention, suitable for lower pressure filtering (e.g. below 1000 psi), in which the backing support is a hollow cylindrical drum 91 having a perforated surface, the drum 91 being mounted for rotation upon a fixed central core member 92 formed with passageways 93 and 94 which communicate with a central outlet 95. It will be appreciated that this form of movable backing support could be used in the devices shown in FIGS. 1 and 2 and in FIG. 3 in place of the backing supports illustrated therein. The radially outermost ends of the passageways 93 and 94 define filtering stations 97 and 98 spaced opposite one another with respect to the axis of rotation of the drum 91. The two filter bands in these Figures are referenced 99 and 100. In all other respects this embodiment is similar to that of FIGS. 1 and 2 though the side members 17 in FIGS. 1 and 2 do not here delimit the filtering stations and may be omitted, end cone 96 being screwed directly into core member 92.

Figure 11:
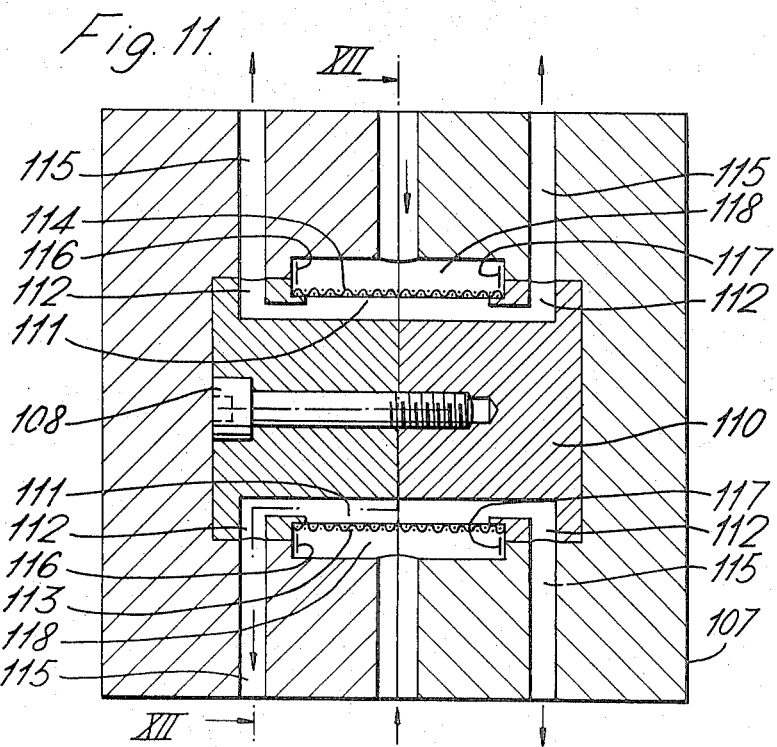
FIG. 11 shows a sectional side elevational view of an embodiment of the invention specially designed for high pressure filtering.
Figure 12:
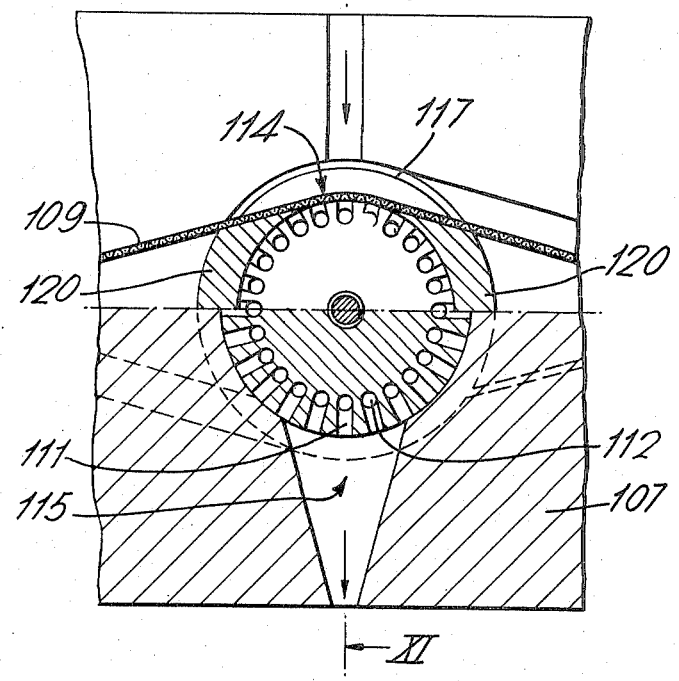
FIG. 12 shows a sectional view taken on the line XII — XII in FIG. 11 and showing the line XI — XI on which the sectional view of FIG. 11 is taken.

FIGS. 11 and 12 illustrate yet a further embodiment, particularly intended for high pressure use - such as for plastics reclamation where highly contaminated polymeric material is being filtered. The filter support is a solid cylindrical drum 110 having axial end portions of greater diameter than a reduced middle portion in which filters 109 are situated. A plurality of axial slots 111 are cut in the outer curved surface of the drum 110 in the middle portion thereof, the slots 111 communicating at each end thereof with L-shaped bores 112 formed in the end portions of drum 110. Filtering zones 113 and 114 are defined by the radially innermost ends of outlet passages 115 formed in the body of the device which, in effect, select those of bores 112 which at any particular time communicate with the outlet passages. Side members 120, affixed to body 107, are provided to eliminate stagnant volume within the device and to keep stray contaminants out of slots 111 when these are so located as not to be covered by the filters, no flow taking place through them in such locations since there is no communication with the outlet passages 115. The side members 120 could be omitted since, in the regions of the backing drum surface where no flow occurs, pressure equalisation would occur on both sides of the filter bands 109.

The flow of substance through the device is indicated by the arrows drawn in the FIGS. Notable in this embodiment are two annular sealing rings 116 and 117 of thin (typically 0.005 to 0.010 inch) metal sheet disposed at either end of the drum 110 and arranged to seal the inlet passages 118 at the junctions of the drum 110 and the body 107 of the device. The rings 116 and 117 are held against the junctions by the pressure of the substance being filtered. It will be seen from the Figures that for ease of construction the backing drum and the body of the device in this embodiment are each formed in two halves which are subsequently assembled together in any convenient manner such as for example in the case of the backing drum 110 by means of the threaded bolt 108.

In use, body 107 is maintained at the appropriate processing temperature by heaters, not shown.

Figure 13:
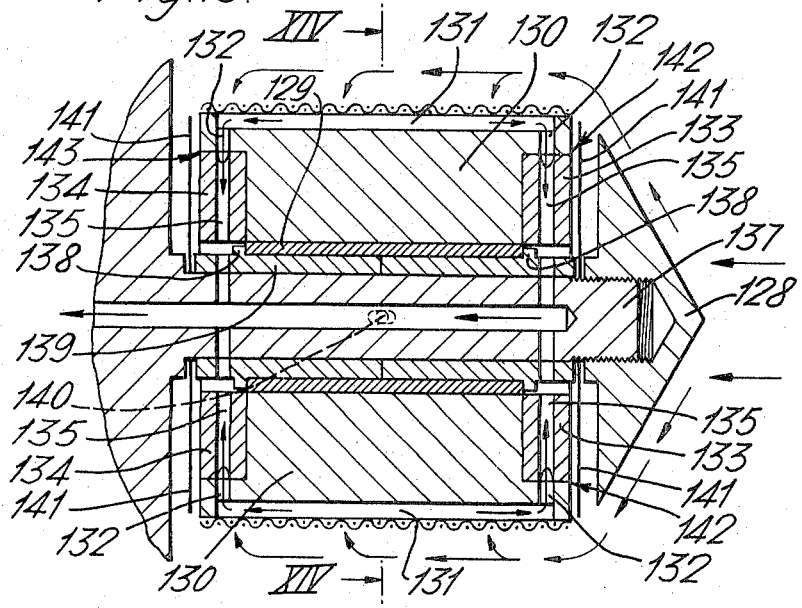
FIG. 13 shows a sectional side elevation of part of a further embodiment of the invention, the spacings between adjacent parts being exaggerated in the FIG. for the sake of clarity.
Figure 14:
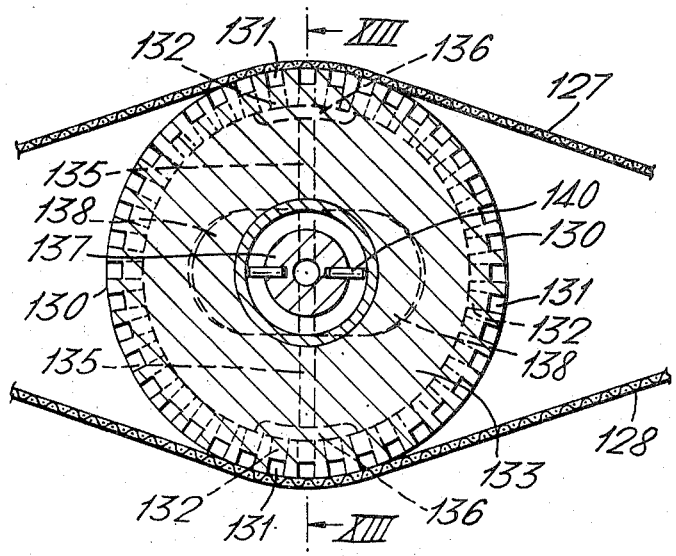
FIG. 14 shows a sectional view taken on the line XIV — XIV in FIG. 13 and showing the line XIII — XIII on which the sectional view of FIG. 13 is taken.
Figure 15:
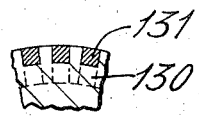
FIG. 15 represents a detail of the support drum section in FIGS. 13 and 14.
Figure 16:
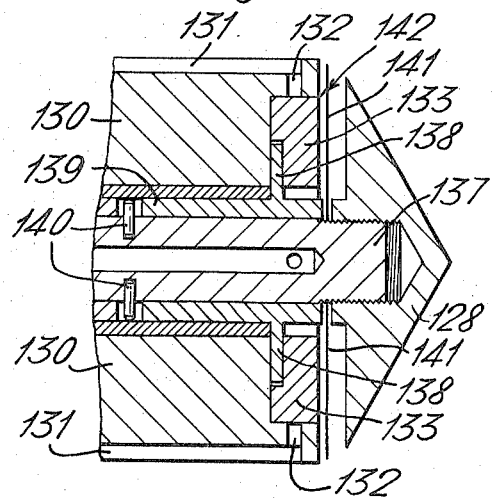
FIG. 16 shows a sectional elevation similar to FIG. 13 but taken in a plane perpendicular to the plane of FIG. 13.

FIGS. 13, 14, 15 and 16, in which certain clearances are exaggerated for the sake of clarity, illustrate an embodiment in which the filter support drum 130 is a relatively massive structure having axial slots 131 in its outer curved surface, the slots 131 extending not quite to the axial ends of the drum. A radial bore 132 extends inwardly for a short distance at each end of each slot 131. Annular sealing rings 133 and 134 of rectangular cross-section are located in respective cut-outs formed in the end faces of the drum 130, and each sealing ring is formed with passageways 135 (see particularly FIG. 14) which extend radially outwardly from the centre of the ring as a simple bore and, towards the outer periphery of the ring, open into distribution regions 136 which define the filtration zones in this embodiment. The sealing rings 133 and 134 are keyed to the fixed central shaft 137 about which the drum 130 is rotatable by means of lozenge-shaped keys 138 (FIG. 14) which are designed to permit slight translational movement of the rings in the sideways direction as viewed in FIG. 14 but to locate the rings against rotational movement, this avoids the need to accurately machine all dimensions of the parts. Keys 138 also locate sealing rings 133 and 134 axially so that they do not tend to grip drum 130 when urged towards it by the hydrostatic pressure differential across the filter. Each key 138 is formed as an integral part of a sleeve 139 which is split centrally for ease of assembly and is itself keyed to the central shaft 137 by means of pins 140. As shown in FIG. 13 there is a certain amount of clearance between the inner cylindrical surfaces of the rings 133 and 134 and the sleeve 139. An annular spring metal diaphragm seal 141 (approx. .005 to .010 inch thick) is provided at each end of the drum 130 to seal the junction between the adjoining surfaces of one end of the drum 130 and sealing ring 133 at 142, and the junction between the adjoining surfaces of the other end of the drums 130 and sealing ring 134 at 143; during assembly of the device when end cone 128 is screwed onto shaft 137, the radially innermost part of each diaphragm seal is firmly clamped between the sleeve 139 and adjacent parts of the device, and it will be appreciated that the pressure of the substance being filtered maintains the seals 141 in sealing relationship with the adjoining surfaces of the drum 130 and the sealing rings 133 and 134. Drum 130 carries a press-fitted sleeve bearing 129 which turns upon the stationary split sleeve 139. FIG. 15 illustrates how the slots 131 formed in the surface of drum 130 may be filled with coarse sintered stainless steel to enable very fine filter bands to be employed; without the sintered material, the fine filter would deform into the slots 131 and would not be effective unless a more substantial supporting band or ribbon were also provided underlying the filter. This embodiment is thus particularly suitable for filtering polymeric melt supplied to spinnerets in the manufacture of synthetic fibres.

FIGS. 17 to 19 show different sealing arrangements which could be used in an embodiment similar to that of FIGS. 13 to 16. FIGS. 17 and 18 show a spring loaded slide valve mounted on a diaphragm seal such as 141 in the preceding embodiment and arranged to receive filtered substance from bores communicating with grooves formed in the curved surface of a relatively moving filter support drum. FIG. 19 shows a cam-operated valve designed to be incorporated into the rotating filter support drum itself for controlling the opening and closing of radial flow passages which communicate with axial slots formed in the backing drum surface and lead to an outlet for filtered substance; in use of this valve the cam surface is stationary.

Figure 21:
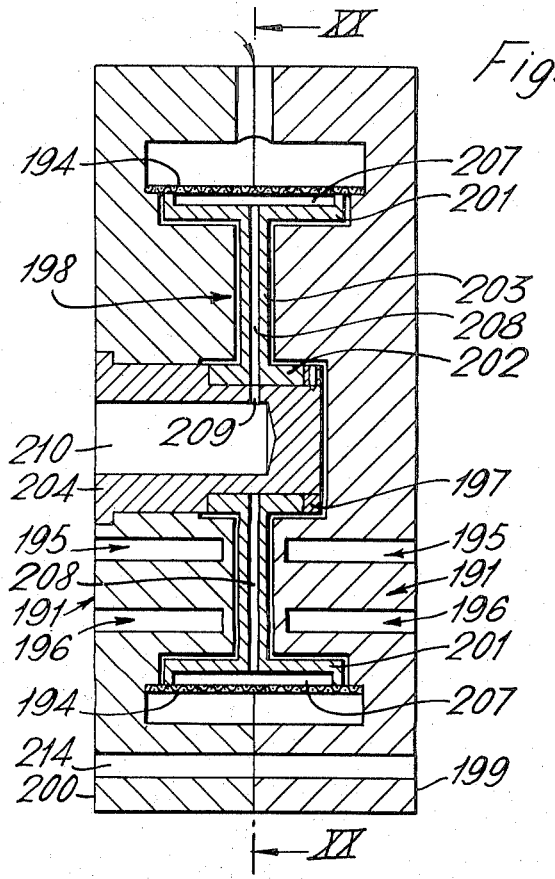
FIG. 21 is a sectional elevational view taken on the line XXI — XXI in FIG. 20 and showing the line XX — XX on which the view of FIG. 20 is taken.

FIGS. 20, 21 and 22 show an embodiment wherein the inlet and outlet ports (shown attached to the remainder of the device in FIGS. 1 and 2, for example) are integrally formed. In this arrangement, filter forwarding is obtained through the hydrostatic pressure of the substance being filtered tending to extrude the sealing plugs in the larger dimensioned outlet ports so that there is applied to the backing support a resultant torque such as to turn the filter support without exerting any significant net thrust upon it owing to the symmetry of the arrangement. The filter backing support is a cylindrical drum 198 having a hollow cylindrical outer portion 201 and a hollow inner hub 202 joined by a web portion 203. The inner surface of hub 202 is journalled upon a stationary hollow shaft 204 affixed in any convenient manner to one half 200 of the body. The other half 199 of the body, fastened to part 200 by means not shown, is removed for clarity in FIG. 20 in which drum 198 and a clamping ring 197 securing it rotatably to shaft 204 are shown in an axial view.

The outer surface of outer drum portion 201 is slotted all round as shown at 207 and the slots 207 communicate (see FIG. 20) with channels 208 formed in the web portion 203 throughout its entire angular extent of 360° around its axis of rotation. The channels 208 in turn communicate with channel 209 formed in only a limited angular range of the shaft 204, and thence with outlet passage 210 in shaft 204. The inlets for admitting substance to be filtered to body 199,200 are referenced 211 and the outlets are referenced 212. Reference numerals 214 denote cartridge heaters and numerals 215 denote coolant flow channels which each penetrate both body halves. The substance being filtered is shown sectioned in FIG. 20 and is omitted for clarity in FIG. 21.

In this embodiment, the filtration zones are delimited partly by the fact that the channels 209 for conveying filtered material from the support drum surface slots 207 via channels 208 to the outlet passage 210 are provided throughout only a limited angular extent of the shaft 204 and are delimited also be virtue of the temperature control of the heaters 213 and 214 and the coolant flow passages 215 which is effected in use of the device. The liquid substance entering the device at each inlet 211 is admitted into a region of the body of the device which is delimited by the slots 216 and 217 cut in the body outer surface and is heated by two cartridge heaters 214; in these regions, therefore, the substance to be filtered is maintained substantially liquid. The regions of the body of the device next adjacent each of these regions, in a counterclockwise sense in FIG. 20, are each delimited by slots 217 and 218 cut in the body outer surface and are cooled by flow of coolant in channels 215; in these regions, solidified sealing plugs of the substance being filtered will be formed and it will be appreciated that the interface between the solid sealing plugs of these regions and the liquid substance in the preceding regions serves to delimit one edge of each filtering zone. The next regions of the body of the device, delimited respectively by the slots 218 and 219 and by the slots 196 best seen in FIGS. 21 and 22, constitute control zones in which the rate of filter forwarding is determined by temperature control of the rigidity of the sealing plug which determines the ease with which the sealing plug can negotiate the adjacent constriction shown in the internal channel of the respective outlet port. Each of these regions together with the adjacent previously described cold region constitutes one of the outlet ports of the device, the other identical outlet port being located diagonally opposite.

The next zones are defined by slots 219, 220 and 196 and constitute final outlet zones which are heated to enable the outlet plugs to be softened sufficiently to negotiate the final reverse curve in each outlet port channel. The central region seen in FIG. 22 and bounded by slots 216, 217 and 195 cut into all the outer faces of the body is kept at processing temperature by heaters 214 so as to keep the substance being filtered in the fluid state. Fresh filter bands 194 enter the device through inlet port zones defined by slots 216, 220 and 195 and cooled by coolant channels 215.

Figure 23:
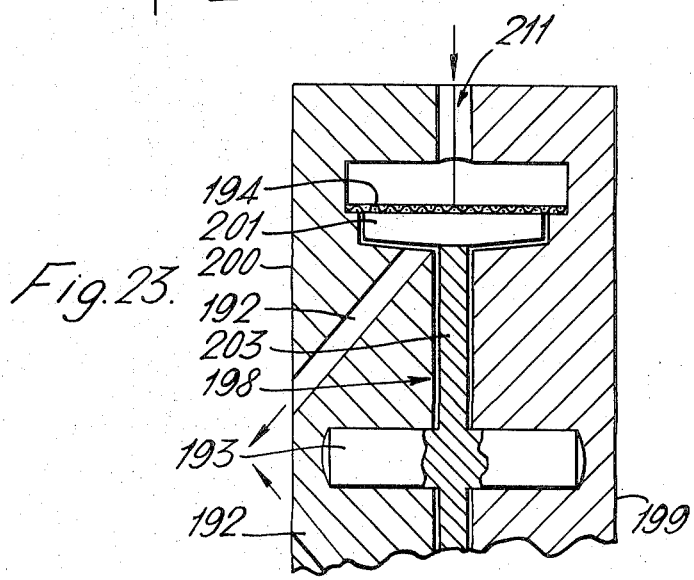
FIG. 23 shows a sectional view similar to that of FIG. 21 of an embodiment similar to that of FIGS. 20 to 22.

As best seen in FIG. 22, the regions cooled by coolant channels 215 form two unbroken zones flanking the central hot region and by thermal conduction cause solidification of the substance being filtered also within the body between the two web regions 191 as seen in FIG. 21. This feature permits the employment of an alternative design, shown in a diametral section containing the inlet channels 211, in FIG. 23 in which the same numerals as appear in FIG. 21 are used to denote like parts. The apertures in rim 201 of the supporting drum 198 here consist of radial cuts dividing the rim completely. Substance being filtered enters the body at 211 and having passed through filter 194 and the radial cuts in the rim 201 of drum 198 leave the body through channels 192. Cold connecting regions 191 solidify the substance within the body on both sides of drum web 203 in the vicinity of the heated final exit zone, thereby preventing leakage into that zone from the heated interior body region. Web 203 of drum 198 may be perforated to give the sealing layer a better grip. The use of radial cuts as apertures permitting the passage of the filtered substance through the rim of drum 198 is advantageous as it does not weaken the rim unduly yet reduces circumferential thermal conduction in the drum thereby aiding the thermal isolation brought about by cuts 216–220. It has been found that by fastening a length of spring steel wire into a helical groove cut into the outer face of the drum, better support of the filter is obtained over the radial cuts consituting the flow apertures in this embodiment; alternatively a coarse wire screen may be affixed onto the curved outer drum face. Drum 198 is provided with an integral centre spigot 193 for locating it and it will be clear that if all forces acting on the drum can be precisely balanced the spigot may be altogether omitted or at least replaced by light supporting rollers locating the drum surface. It will be clear that axially spaced multiple drums may be employed when large filtering area is required.

It will be appreciated that a twin-drum configuration such as is described in connection with FIG. 4 could also be utilised in an arrangement in which the inlet, filtering and exit zones are defined by means of heating and cooling in the manner described in connection with the embodiment of FIGS. 20–23. A reasonable degree of force balance over the supporting members is here obtained through planar rather than axial symmetry.

Figure 24:
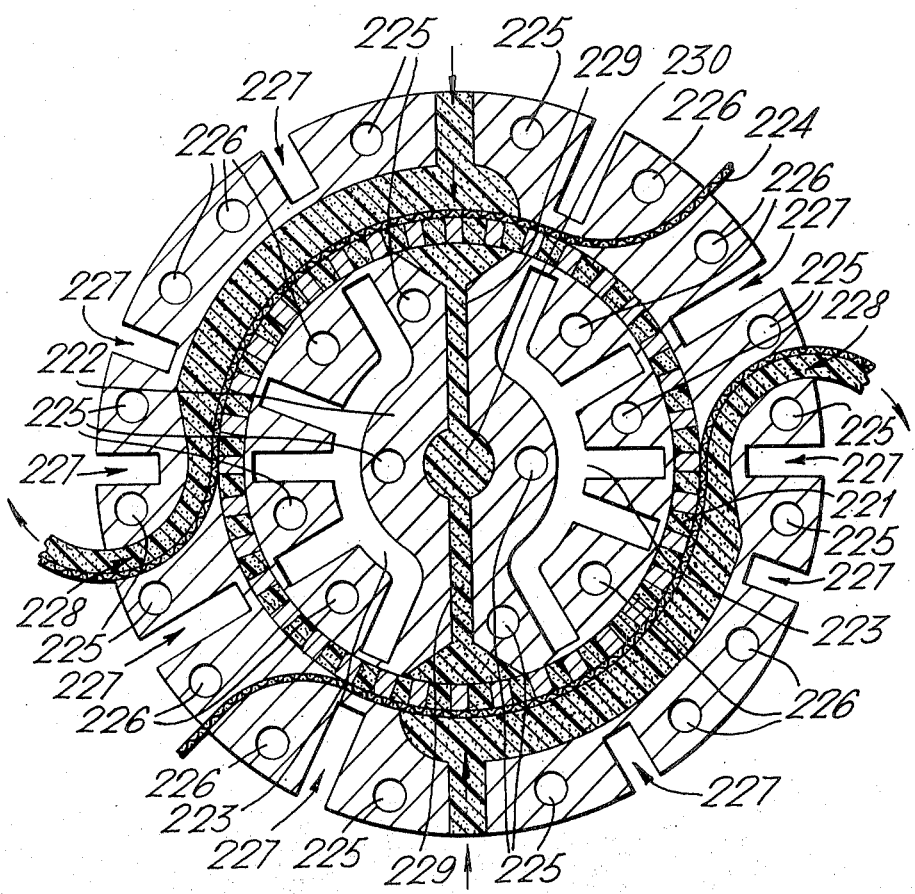
FIG. 24 shows a sectional top plan view of another embodiment similar to that of FIGS. 20, 21 and 22.
Figure 25:
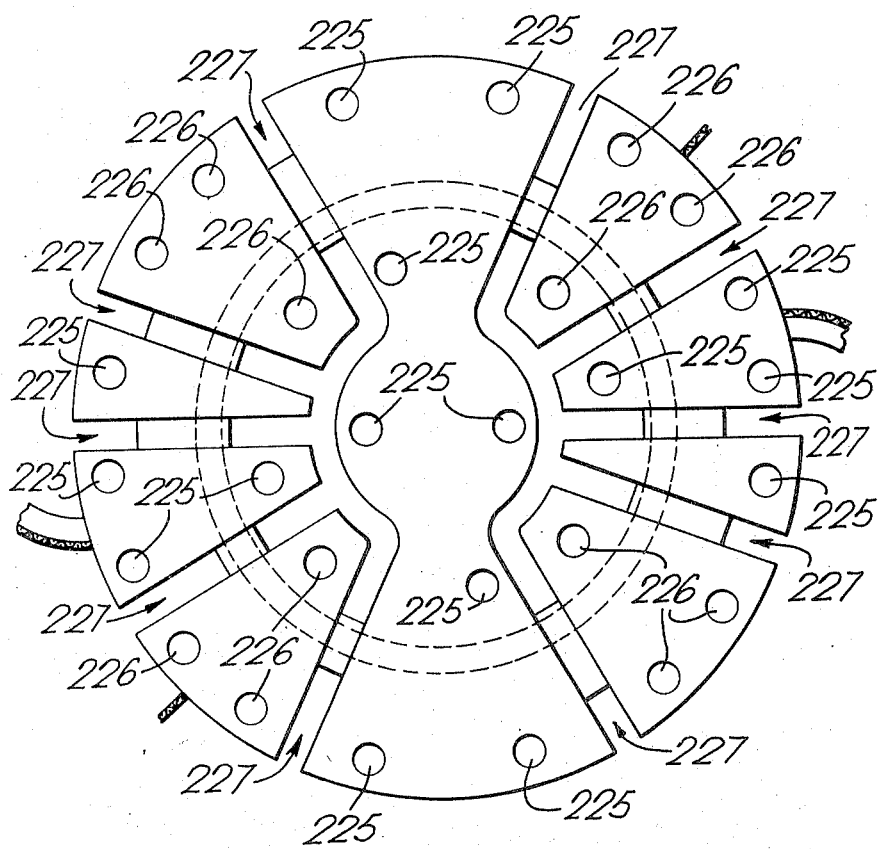
FIG. 25 is a top plan view of the embodiment of FIG. 24.
Figure 26:
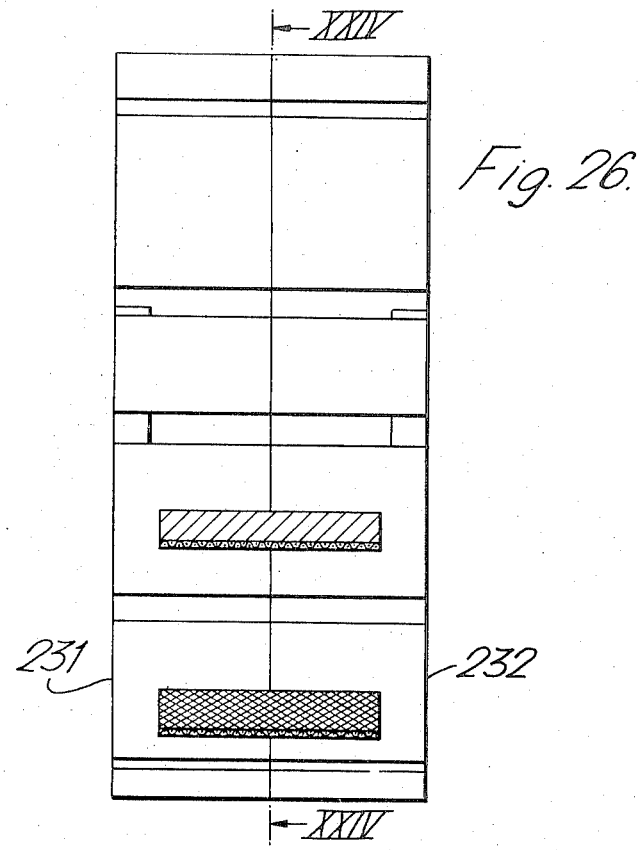
FIG. 26 is a side elevational view of the device of FIGS. 24 and 25 viewed from the left hand side and showing the line XXIV — XXIV on which the sectional view of FIG. 24 is taken.

The embodiment of FIGS. 24, 25 and 26 is similar to that of FIGS. 20, 21 and 22, differing therefrom primarily in that the construction is more massive and thus is suitable for high pressure filtration. The construction of the stationary outer body of the device is similar to that of the preceding embodiment but the rotating backing support drum is, in this embodiment a plain hollow perforated cylinder 221 and is journalled upon a relatively massive stationary central core 222 which has different temperature zones corresponding to the different regions of the outermost body portion of the device, the different temperature zones being defined by cut-outs 223 formed in the core 222 with the cut-outs 223 running through the entire axial length of the device.

The inner and outer parts of the stationary body are made in two symmetrical halves 231 and 232 as best seen in side view on FIG. 26 or sectioned in FIG. 24 and are fastened together in any suitable manner. In this embodiment, heaters, for example cartridge heaters, are denoted 225 and cooling channels are denoted 226. FIGS. 25 and 26 are of note in that they show the complete thermal isolation by the cuts 223 and 227 of the various regions of the body of the device which have the same purposes as those described in connection with FIGS. 20 and 22. The filtering zones in this embodiment are delimited by the divergent ends of a passage 229 formed through the core 222 and communicating with an axial outlet channel 230. In operation, this embodiment performs in the same way as does the embodiment of FIGS. 20, 21 and 22.

It will be noted that, in the embodiments of FIGS. 20, 21 and 22 and FIGS. 24, 25 and 26, the body of the device is heated by means of suitably located heaters in the regions thereof whereat the filters are stripped from the surface of the backing drum prior to exiting from the device each through a respective outlet port. This ensures the ready removal of the filter from the backing drum by softening the sealing plug substance permeating the filter band and filling the slots or perforations in the backing drum surface which, if not softened, might bind the filter band firmly to the backing drum and hinder their separation. When filtering substances showing low adhesion which enables the spent filter to be readily parted off the supporting drum a modified form of the embodiments of FIGS. 20 to 26 could be employed in which the portions of the body of the device between an exiting spent filter and the adjacent incoming fresh filter were omitted, thus exposing the backing drum in these two regions. The exiting spent filter and the adjoining incoming fresh filter would thus move through the same aperture in the side of the device. In such a construction, it would of course still be necessary to maintain the inlet and outlet port constructions enabling formation of the necessary sealing plugs.

Figure 27A:
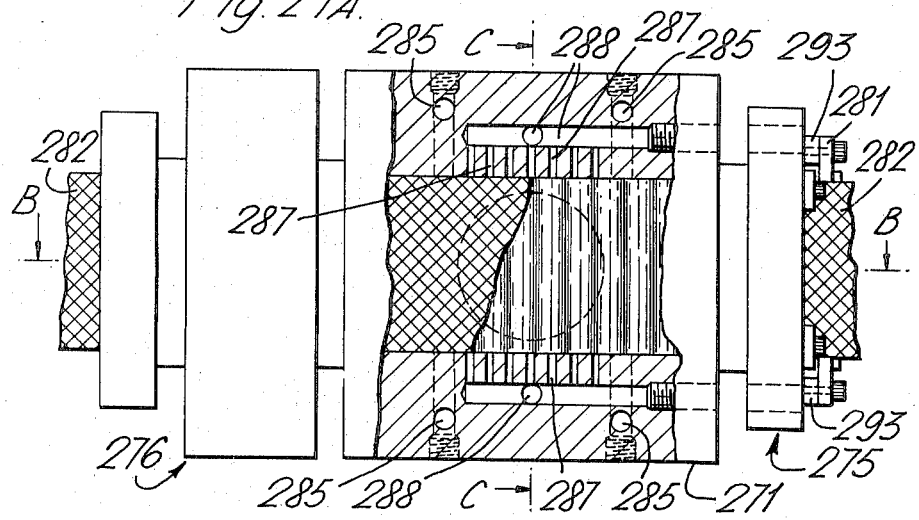
FIGS. 27A, 27B and 27C show a first composite filter/backing support embodiment of the invention in sectional top plan, side elevational and end elevational views respectively, the sectional view of FIG. 27B being taken on the line B—B in FIG. 27A, and the sectional view of FIG. 27C being taken on the line c—c in FIG. 27A.
Figure 27B:
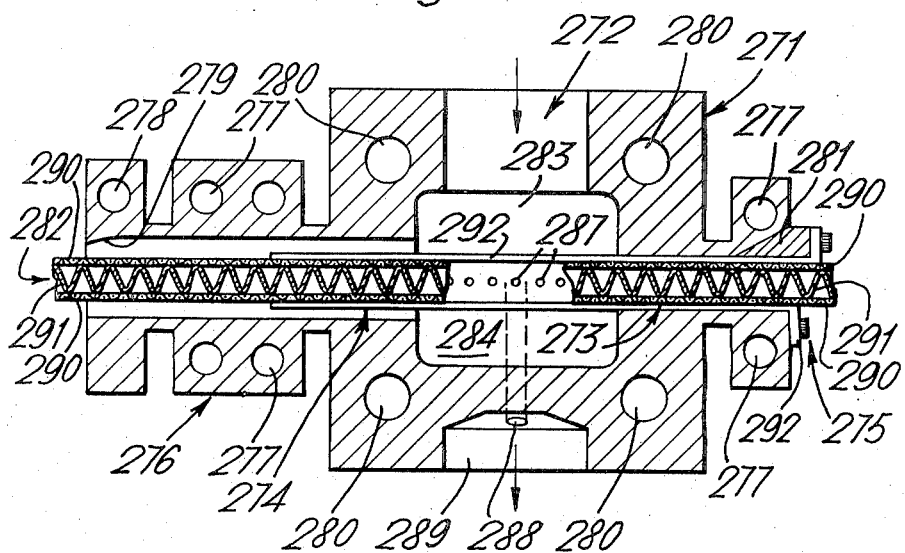
Figure 27C:
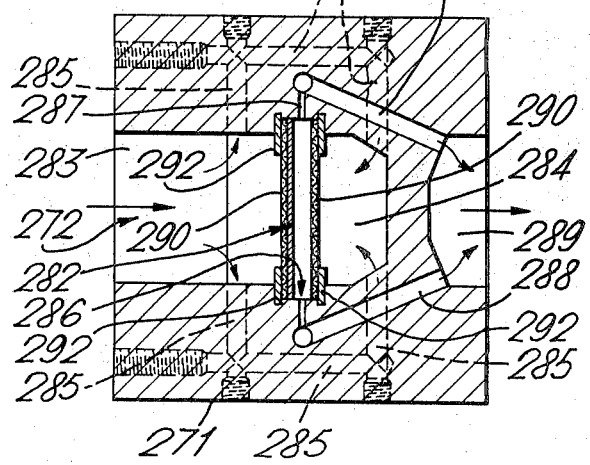
Figure 30:
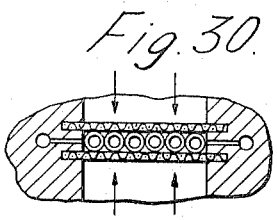

It will be clear that in all the embodiments described the order of the temperature controlled tapering and parallel walled cooled sealing zones of the exit port could be reversed. Referring now to FIGS. 27A, 27B and 27C of the accompanying drawings, the embodiment of the invention shown therein comprises a filtering device having a body 271 having formed therethrough a passage 272 through which a substance to be filtered can be caused to flow and having slotted inlet and outlet channels 273 and 274 respectively which communicate with slotted inlet and outlet ports 275 and 276 respectively, the ports 275 and 276 being provided with cooling channels 277 for providing temperature conditions at the ports such as to result in the formation therein of sealing plugs of the substance being filtered, and the outlet port 276 having a heater 278 in a constricted outlet portion 279 thereof which serves for controlling the rate of forwarding movement of the sealing plug in the outlet port. Heaters 280 are also provided in the body of the device and it will be seen that the ports 275 and 276 connect with the body of the device through waisted portions which minimize heat conduction between the heated body 271 and the adjacent cooled part of ports 275 and 276. An adjustable wedge 281 provides for adjustment of the inlet port aperture. A composite filter/backing support structure 282, which is described more fully below, is introduced into filtering passage 272 by way of inlet port 275, extends across filtering passage 272 as shown, and exits therefrom by way of outlet port 276. Reference may be made to my U.S. Pat. No. 3,471,017 for a more full description of the construction and operation of the parts of the device this far described.

It is to be noted that substances which harden when heated, such as rubber which hardens when heated by a process of thermal cross-linking, can be filtered in devices of this type, the heaters 280 being replaced by coolant channels and the coolant channels being replaced by heaters with the apparatus otherwise performing in the same manner. It is also to be noted that, where filter forwarding is achieved at least in part through hydrostatically developed forces tending to extrude the sealing plug in he outlet port, the provision in the outlet port of a final heated stage (such as that containing heater 278) enables the movement of the outlet plug past a constriction in the outlet port to be controlled; this stage of the outlet port can be omitted altogether if the control of filter movement is effected mechanically.

Referring more particularly to the form of the passage 272, it will be seen from FIG. 27C that the passage is divided into two parts 283 and 284 by the composite filter/backing support structure 282 which extends therethrough. The two parts 283 and 284 communicate with one another via bores 285 formed in the body 271 of the device, so that substance to be filtered entering filtering passage part 283 flows through communicating bores 285 into filtering passage part 284. In this way, both sides of the composite filter/backing support structure are made accessible to substance to be filtered. The bores 285 are dimensioned to ensure substantial pressure equalization between the two parts of the filtering passage and are closed at their outer ends by means of screw-threaded plugs.

The composite filter/backing support 282 is received at its edges in recessed seats 286 in the internal walls of the filtering passage 272, and a plurality of bores 287 extend from a region of the seats 286 into channels 288 which communicate with the outlet 289 of the device. In use, substance filtered by the composite filter/backing support structure and received within the backing support passes therefrom through the bores 287 and channels 288 into the outlet 289 of the device.

The composite filter/backing support structure 282 is made up of two woven wire cloth bands or ribbons 290 supported one on each side of a corrugated metal backing support 291, the corrugations of the backing support 291 extending transversely to the direction of movement of the structure 282 through the device. It will be appreciated that, in use of the device, substance permeating through the filters 290 will enter the spaces between the corrugations of the backing support 291 and will be taken off by way of the bores 287, and channels 288 to the device outlet 289. Seals are provided at the longitudinal edges of the composite filter/backing support structure 282 to prevent leakage of substance to be filtered directly from the filtering passage parts 282 and 284 into the bores 287, the seals comprising flexible metal sealing strips 292 which locate in the recessed seats 286 and are held against the filter/backing support assembly either solely by the hydrostatic pressure of the substance being filtered or partly under the action of a suitable spring bias. The sealing strips 292 are each attached to the body 271 of the device at one end only, two of the strips 292 being bolted directly to the inlet 275 and the other two being bolted to the inlet port adjustment wedge 281 as shown in FIG. 27B. It is advantageous to provide spacers 293 separating wedge 281 from the face of inlet 275 so as to locate the wedge and prevent its being forced tightly into its seat by the frictional drag acting on the two sealing strips 292 attached to it.

Consideration of FIG. 27C will demonstrate that, in operation of the embodiment of FIGS. 27A, 27B and 27C, the hydrostatic pressure induced forces exerted upon the composite filter/backing support structure by the substance being filtered will not hinder the movement of the composite filter/backing support structure, the only hindrance to movement arising through frictional drag at the edges of the composite filter/backing support structure where it is necessary to compromise between ease of movement and efficiency of sealing. The ease of movement here may be increased for example by welding the filters 290 to machined edge srips adapted to make easy sliding contact with sealing strips 292. It will be seen that in the described device, the resistance to movement of the composite filter/backing support structure is substantially independent of the active filtering area. Furthermore, by virtue of the provision in the device of a double sided filtering arrangement, the active filter area is doubled as compared for example with the filtering devices disclosed in my U.S. Pat. No. 3,471,017.

Referring now to FIGS. 28A and 28B the embodiment of the invention illustrated therein is similar in many respects to that just described and differs therefrom primarily in respect of the means of supporting the composite filter/backing support structure in the filtering passage and the form of the seals provided to prevent leakage of substance to be filtered directly into the outlet bores around the edges of the composite filter/backing support structure. Where appropriate, the same reference numerals are used in FIGS. 28A and 28B as were used in FIGS. 27A, 27B and 27C to denote like parts.

In the embodiment of FIGS. 28A and 28B the filtering passage 272 opens into a chamber 300 within which the composite filter/backing support structure 282 is supported at its edges by means of rod-like members 301 which are fitted in accommodating bores formed in the body of the device and extend freely across the chamber 300. The members 301 are spaced from the walls of the chamber 300 at 302 so that substance to be filtered can flow freely around them to approach the side of the composite filter/backing support structure 282 which is facing away from the inlet of filtering passage 272. Each supporting member 301 is conveniently formed in two longitudinally extending parts which come together as shown to define a longitudinal outlet channel 303, apertures 304 making communication between the outlet channel 303 and the structure 282, support seats 286 for taking off filtered substance within the backing support and seats for a thinly plated copper sealing wire 305 which seals the two parts together on the side of the channel 303 opposite the filter/backing support structure. In use of this embodiment, filtered substance permeating into the backing support after passage through the filters passes therefrom via the apertures 304 into the outlet channels 303 whence it is extracted from the device via outlet pipes 307. Longitudinal support rods 306 will be noted in the filtering passageway; these serve to assist the initial threading of the filter/backing support structure through the device and also serve to support the composite filter/backing support structure against any surge pressure differentials it may experience in use such as during initial filling of the device with substance to be filtered. Sealing in this embodiment is achieved by means of the two parts of each support member 301 which between them bear against the edges of the composite filter/backing support 282.

FIG. 28C is a schematic illustration of an arrangement similar to that shown in FIGS. 28A and 28B but with the inlet for substance to be filtered rearranged in relation to the composite filter/backing support structure so as to provide a more symmetrical configuration which is less susceptible to supply pressure variations and enables the support rods 306 of the FIGS. 28A and 28B configuration to be dispensed with. As can be seen from FIG. 28C, substance to be filtered is admitted to the filtering chamber in such a way that each filter is equally subject to pressure variations, as opposed to the arrangement of FIGS. 28A and 28B, wherein the approach paths of substance to the two filters and their flow resistances are unequal.

FIGS. 29 to 56 show different backing support arrangement which might be used.

In FIG. 29 a backing support is shown which comprises perforated metal tubes which can be inserted one after another into receiving guide channels provided for defining a travel path for the tubes successively through the inlet port, the filtering passage, and the outlet port of the device. Helical spring wires may also be used in place of perforated tubes and function equivalently thereto, the spring wires being disposed either transversely to the filter or running parallel with it as shown in the transverse sectional view of FIG. 30 which is a fragmentary view similar to the central part of FIG. 27C but with the filter bands themselves providing sealing at the edges of the composite filter/backing support structure.

Figure 31A:
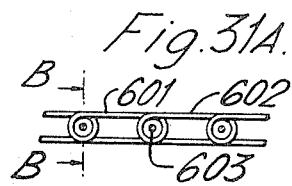
Figure 31B:
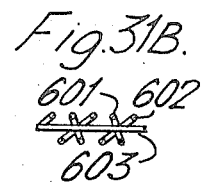

FIGS. 31A and 31B show in end elevation and longitudinal section an arrangement in which the backing support comprises an interwoven assembly of wound wire helices having a semi-ellipsoidal cross-section, the helices being shown in the FIGS. held together by separate linking wires although they could be interleaved; in the FIGS., the separate helices are designated 601, 602 and a linking wire is designated 603. While, in the FIGS., the linking wires 603 are shown to be straight, they could be of undulating form. As an alternative to linking wires, flexible braided wire ropes could be used for linking the helices together where flexibility is desirable, e.g. where it is desired to recirculate an endless support belt formed of linked longitudinal helices. Such an assembly may be of a continuous extended form or it may consist of a joined assembly of linked sections of woven wire belting, usually somewhat flexible and a few feet long per section, linked together for example by hook-and-eye joints formed at the ends of the wires comprising one set of components of the woven belting. Another method of joining neighbouring sections together utilizes loose wires which may be slipped through two adjoining helices; alternatively narrow metal plates of the same width as the wire helices may be affixed to the set of wires running longitudinally along the backing support and neighbouring plates are then joined together when required with spring clips or by other means, provided only that the filters are adequately supported over the joints against the pressure difference loading them. The backing support may also have an endless form as shown in another context in my U.S. Pat. No. 3,645,399; indeed the entire composite filter assembly may be provided in such a form.

Figure 32:
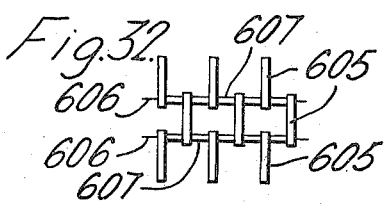

A similar backing support arrangement to that of FIGS. 31A and 31B is shown in FIG. 32 which is a top plan view. The backing support of FIG. 32 comprises a flexible assembly of a plurality of spacer elements 605 threaded upon support wires 606 and separated from one another by tubular members 607. This is equivalent to an articulated chain structure.

Figure 33:
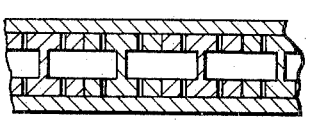
Figure 34:
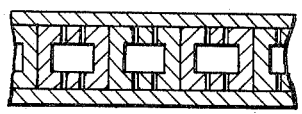
Figure 35:
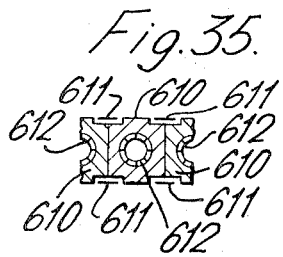

FIGS. 33 and 34 show arrangements wherein the backing support is made up of a plurality of loose separator slats which are inserted between the filters at the inlet port of the device; in FIG. 33 the slats are each of I-beam section, in FIG. 34 the slats have a hollow rectangular box section, and in both cases the slats are perforated as shown to admit filtered material to the hollows in the interior of the composite structure. In each of the construction of FIGS. 33 and 34 the slats are adapted to support filter bands as shown on two opposite faces thereof. In practice, the slats could themselves be such as to provide a filtering function e.g. if they were formed of permeable sintered metal. FIG. 35 illustrates such a construction having sintered metal filter elements 610 supported in the apertures of two metal ladder tapes 611, the elements 610 each being hollow and preferably, though not essentially, being provided with internal reinforcement in the form of perforated tubes or wound helices 612.

Figure 36:
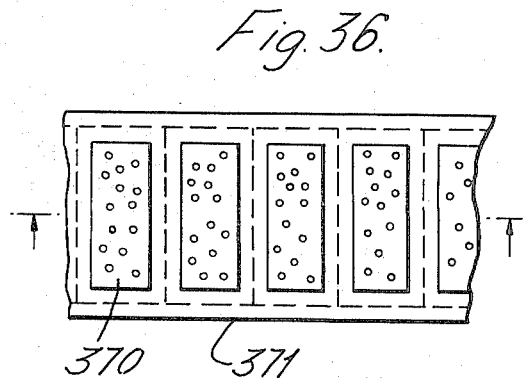
Figure 37:
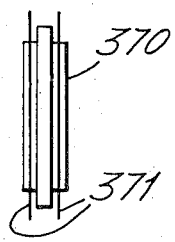
Figure 38:
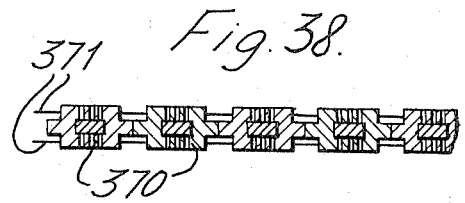

FIGS. 36, 37 and 38 show respective top plan, end elevational and side sectional view of a construction in which the composite filter/backing support structure is formed of a plurality of composite filter/backing support elements 370 held within the apertures of a pair of metal ladder tapes 371 which in use provide sealing both between adjacent elements and between the composite structure and the device in which it is employed, each element comprising a hollow box structure faced with sintered metal filters supported by a permeable supporting grid. It will be appreciated that in the construction of FIGS. 36, 37 and 38 the metal ladder tapes 371 could be omitted for example by arranging the elements 370 themselves to provide the sealing function, for example, by providing them with independent overlapping sealing skirts. Furthermore, in the arrangement of FIGS. 36, 37 and 38 the ladder tapes 371 could be formed as closed loops which continuously recirculate through the apparatus.

A filter consisting of a succession of discrete filter elements such as has been described herein with particular reference to FIGS. 29 and 33 to 38 could be used with a rotary backing support arrangement with the discrete filter elements arranged to function at least two at a time so as to obtain the desired forcewise equalization. FIG. 39 is a schematic showing of such a filter arrangement with a backing support of the type herein described with particualar reference to FIGS. 9 and 10. As shown schematically in FIG. 39, two filter bands 99 and 100 each in the form of a plurality of serially-interconnected discrete filter elements are arranged for cooperation with a rotary backing support arrangement in the form of a hollow cylindrical drum 91 formed with radial extraction passages journalled for rotation upon a central core 92 formed with valve means 93 to determine which of the radial extraction passages formed in the drum 91 is operative at any time. It will be seen from FIG. 39 that the entrances to the radial extraction passages formed in the drum 91 are arranged to synchronise with the discrete filtering elements; to this end, the external surface of the drum 91 may conveniently be formed with portions shaped complementarily to the shape of the discrete filter elements and each adapted to provide a seat for a discrete filter element. The cooperation of the valve means 93 with the radial extraction passages in the drum 91 ensures that there is no substance flow through extraction passages not associated with an active or operational filtering element. Whereas the discrete filter elements shown in FIG. 39 are joined together in a flexible manner, it will be appreciated that the arrangement could be such that they are introduced separately and independently of one another in which case they might each be provided with sealing skirts adapted to overlie those of an abutting filter element so as to provide sealing therebetween.

Where the backing support comprises tubular or slatted members, the individual backing support members may be joined together if desired with a simple up and down wire weave for example; alternatively a strong and if required flexible backing support can be constructed having a spring steel spine carrying tansverse slatted members on one or both sides; such an arrangement is shown in FIG. 40 which is a side elevation view showing spring steel spine 615, transverse slatted member 616 and filters 617.

Alternatively, the backing support may comprise a plurality of individual slats or tubes joined by inserting them one by one into the openings of a woven wire mesh or by spotwelding them onto longitudinally disposed carrying wires or rods; FIGS. 41A and 41B are respectively one such arrangement in top plan and end elevation views constructed by welding together longitudinal wires 620 and transverse wires 621, and FIGS. 42A and 42B are like views of a similar construction formed of bent sheet-metal spacers 622 and longitudinal connectors 623 welded thereto. If a carrying wire mesh is used this may also pass through apertures in the slatted or tubular members and the wires may be crossed over between the slats or distance pieces may be employed between them, resulting in a structure somewhat akin a string of beads. Alternatively the wires may embrace grooved protions of the slats and in the case of hollow tubular slats an interconnecting wire may pass along one slat and on emerging, pass into and along its neighbour resulting in a flexible structure of good sideways alignment if two sets of such wires are used.

FIGS. 43 shows a backing support in the form of a resistance welded structure having perforated outer skins such as to admit filtered material to the backing support interior. A similar structure shown in FIGS. 44A and 44B, which respectively show end elevation and sectional views, comprises a pair of sheet metal plates 625 and 626 stamped to form protuberances 627 which bear upon one another; two filter bands 628 are shown in this figure. The plates 625 and 626 may be perforated for ease of flow of filtered material. Reference numerals 629 designate edge sealing strips.. An arrangement similar to that of FIG. 44 could be constructed with the plates 625 and 626 replaced by woven steel screens of sufficient strength, in which case the filter bands 628 could either be supported as shown in FIG. 44 or alternatively could be formed integrally with the woven steel screens replacing plates 625 and 626.

Figure 45A:
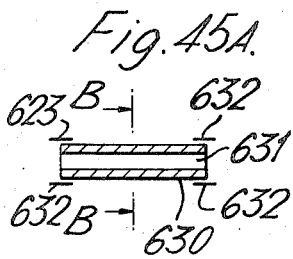
Figure 45B:
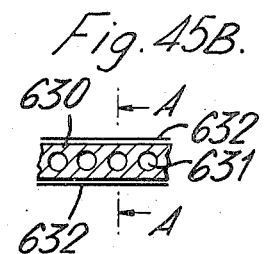
Figure 46:
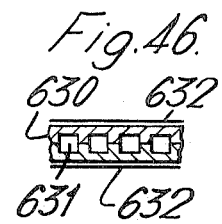
Figure 47A:
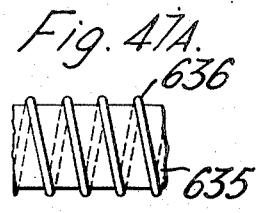
Figure 47B:
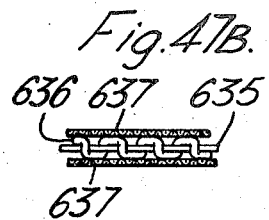

FIGS. 45A, 45B and 46 show arrangements similar in many respects to that of FIG. 44 but with the backing support formed of sintered metal. In FIGS. 45A and 45B, which show sectional end and side elevation views respectively, a sintered metal slab 630 has openings 631 for extraction of filtered substance. In FIG. 46 which is a view similar to that of FIG. 45B but of a different construction, the sintered metal is formed in two parts which come together to define openings. The sintered metal may itself serve as the filter in these embodiments or may be coupled with woven wire filter screens. Sealing strips 632 may be brazed to the sintered metal or to the filter screens where provided, or alternatively, where filter screens are provided, sealing may be effected by means of the edges of the filter screens themselves.

Figure 48:
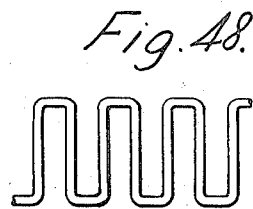

FIGS. 47 to 54 show various other backing support arrangements which could be used. In FIGS. 47A and 47B, which respectively are top plan and side elevational views, the backing support comprises a flexible metal strip 635 having helically would thereupon a wire 636; filter bands 637 are shown supported upon such a backing support in FIG. 47B. FIG. 48 shows a simple bent wire arrangement which could be used on its own or combined with a similar arrangement with the undulations of the two arrangements in antiphase thereby defining a ladder construction. Similar arrangements shown in FIGS. 49 and 50 comprise respectively a plurality of rods 638 welded to each other at their ends, and a bent metal strip 639 reinforced against twisting by means of a strip of metal 640 welded thereto at least on one side.

Figure 49:
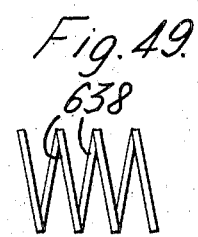
Figure 51:
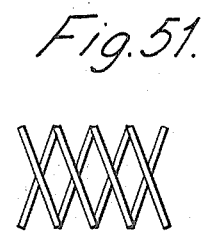

FIG. 51 shows a welded rod arrangement alternative to that of FIG. 49.

Figure 52:
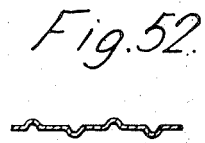
Figure 53:
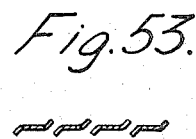

As shown in FIG. 52 which is a sectional view, a dimpled, and optionally also perforated, metal sheet may be used as a backing support either alone or in a layered arrangement with one or more other such sheets; as an alternative to dimples, grooves and/or ridges may be formed in the metal sheet. Expanded metal sheet is also suitable for this purpose, with the remaining connecting ribbons oriented so as to form at least one set of angles with the general plane of the sheet. FIG. 53 shows yet another arrangement comprising metal sheet having raised portions released therefrom.

Figure 54:
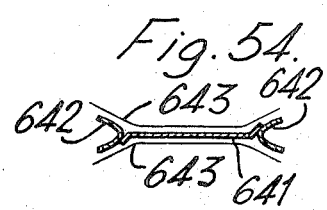

Finally, FIG. 54 which is an end view shows an arrangement comprised entirely of woven wire screen. A coarse woven screen 641 (or a number of layers of such coarse woven wire screens) is resistance welded at its edges to two bent woven wire bands 642 and the assembly thus formed supports more-finely woven wire filters 643 either singly or in multiple layers.

Figure 55:
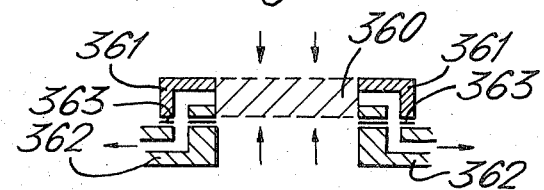

It will be clear that the flow of filtered material need not leave the filtering elements in a direction parallel with the plane of the filter. FIG. 55 shows cross-sectionally a filter element consisting of sintered filter 360 fitted with a hollow end frame 361 making up a rigid box which has exit apertures at two sides, matching take off channels being provided in the stationary part 362; the spaces between the boxes are sealed by apertured tapes 363 moving with the boxes. The boxes may also be hollow and covered with filter material along both sides or at least one side, perforations being provided under the filters which may be either discrete or parts of continuous filter bands.

Figure 56:
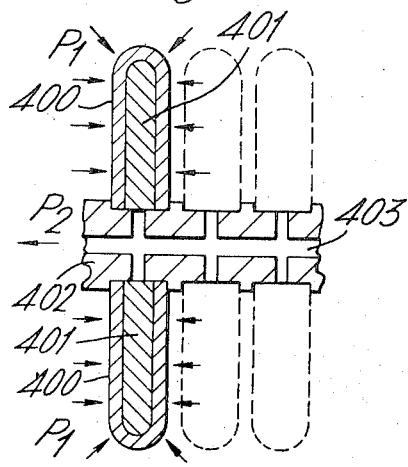

FIG. 56 shows an arrangement wherein an elongated composite filter/backing support structure comprises a folded sheet 400 of sintered metal supported by an inner permeable backing support 401 and arranged to slide over a guide strip 402 provided within the filtering passage and having extraction channels 403 formed therein; in this arrangement, the large hydrostatic forces acting upon the filter faces have a comparatively small resultant which presses the filter structure against the stationary guide strip 402 sufficiently firmly to effect adequate pressure sealing consistent with minimal frictional drag. Where large overall filtering area is required, the construction of FIG. 56 enables multiple filters to be provided as shown in outline.

Figure 57:
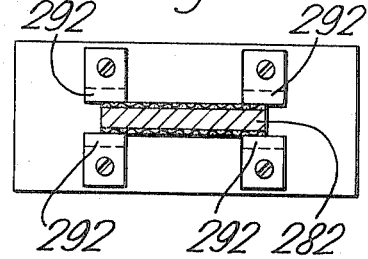
Figure 58:
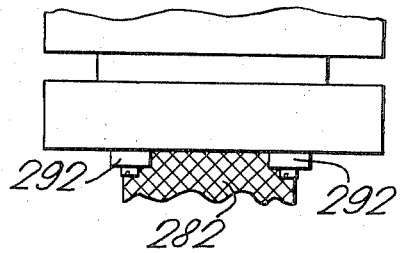
Figure 59:
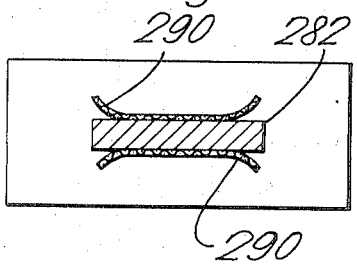
Figure 60:
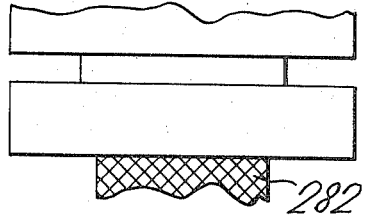

FIGS. 57 and 58 show end elevational and plan views respectively of sealing means similar to those employed in the embodiment of FIGS. 27A, 27B and 27C wherein sealing strips 292 overlap and bear against the edges of the composite filter/backing support structure 282. FIGS. 59 and 60 represent an alternative to this wherein the outer filter layers themselves provide the edge sealing; in accordane with this alternative arrangement, the edges of the outer filter layers 290 are deformed to act as sealing strips which bear against the internal walls of the filtering passage. Where the filter layer is a laminate structure of coarse and fine filter screens, the exposed edges of the coarse screen could provide a leakage path and this can be avoided by folding the fine screen around the edge of the coarse screen or by plasma welding the coarse and fine screens together at their edges; alternatively, the edges may be rendered impermeable, for example by brazing.

Figure 61:
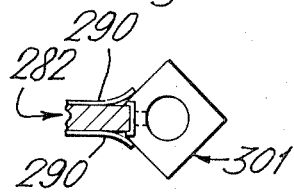
Figure 62:
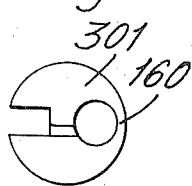
Figure 63:
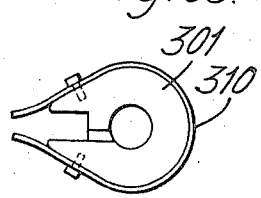

FIGS. 61 to 66 show variations in the form of the support members 301 of the embodiment described with reference to FIGS. 28A and 28B. FIG. 61 shows the members 301 each formed as a single part and of hollow rectangular section bar so as to enable sealing to be effected around the edges of the composite filter/backing support structure 282 by means of the extremities of the filter layer 290 being overlapped as shown over part of the surface of the support member 301; this sealing arrangement is similar to that just described with reference to FIGS. 59 and 60. FIG. 62 illustrates an arrangement in which the member 301 again is formed as a single part, this time of circular section, and has a thin flexible part 160 enabling it to flex under pressure so as to effect sealing with the composite filter/backing support structure. FIG. 63 utilizes a thin flexible steel tape 310 secured around the member 301 as shown to provide flexible seals which, in use, embrace the edge of the filter/backing support structure. FIGS. 64 and 65 show supporting members 301 similar to that shown in FIGS. 28A and 28B, the member 301 of FIG. 64 being sealed at its outer edge (the right hand edge as viewed in the figure) with copper sheet inserted in a V section channel and the member 301 of FIG. 65 being sealed with copper wire. FIG. 66 represents a side elevational view of any of FIGS. 62 to 65 showing the formation of the apertures 304 as the spaces between interpenetrating locating teeth formed in the two parts of the member.

FIG. 67 shows an arrangement for bleeding filtered substance from the filtering passage and feeding it into an impregnation zone of the inlet port where it enters the interstices of the composite filter/backing support structure. As mentioned previously, the purpose of this is to prevent excessive back flow of filtered substance within the backing support in cases where the construction of the backing support is such that little resistance is presented to such internal flow. Two cooled zones 411 and 412 are provided in the inlet port flanking a heated zone 413 and a locally constricted or capillary tube 414 connects the heated zone 413 with one of the channels provided to take-off filtered substance from the filtering passage. The constriction ensures that molten substance can fill the heated zone 413 and approaches the adjoining cooled zones 411 and 412 only slowly so that the substance has sufficient time to solidify next to or within the two cooled zones.

When operating an inlet port of the type shown in FIG. 48 during filtration at high pressures, it has been found beneficial to provide zone 413 with a strain-gauge type pressure transducer governing a flow valve in supply line 414; by shutting off the flow of impregnant before the full filtration pressure is reached, the inlet plug forms with zone 412 at low pressure and accordingly exerts only small forces against the walls of the inlet port. Hence the filter need not exert much pull when moving the sealing plug into the filtering chamber. Alternatively, zone 411 may be heated instead of cooled and equipped with a suitable level sensing device, the inlet being so disposed that the filter moves vertically downwards. Where the backing support flow channels are sufficiently permeable to a radiation for which the substance being filtered is adequately opaque, level sensing may be effected with the aid of a phototransducer in a manner such as is described in my U.S. Pat. No. 3,645,399; when the desired level of impregnant polymer is reached within zone 411, the supply is shut off. It will be clear that any known method of level sensing may be employed if sufficient clearance is allowed beside the filter and that other methods of pre-impregnating the filter assembly may also be employed; for example, impregnant material may be provided from an independent reservoir or metered-in by means of a metering cylinder-piston arrangement or controlled visually. Where the backing support is comparatively expensive it will be preferred to provide it in the form of a re-entering endless belt in a manner described in my U.S. Pat. No. 3,645,399 where it is also shown how a filter may be separated from its backing support by means of heat and mechanical separation; in this case, the backing support remains impregnated with clean polymer and in most cases no further impregnation will be necessary before its reintroduction into the filtering chamber. The heat required for separation may be supplied as radiant heat or by means of a suitable heat transfer fluid such as hot air and the filters may be pulled off the backing support, preferably aided by a heated wedge on either side of the backing support.

Another kind of impregnating inlet, relying on the principle of cyclic annealing discussed in conjunction with FIGS. 7 and 8 is shown in FIG. 68. The composite filter assembly 450 is admitted to the filtering chamber through four adjoining zones 451, 452, 453 and 454 equipped with heaters 455 and coolant channels 456; impregnating zone 453 is provided with molten impregnant from an adjoining supply tube 457 which has a bore 460 for impregnant flow, a further channel 458 for coolant flow and is surrounded by cuff heater 459. Zone 451 is permanently cooled and, during the impregnating phase, zones 452 and 454 are cooled also whilst zone 453 and supply tube 457 are heated, the latter only sufficiently to admit a slow flow of impregnant to injecting nozzles 461 within zone 453. When the impregnant level reaches zone 454, a solid plug is formed therein or within the necked part separating zones 453 and 454 and further flow ceases. Supply tube 457 is next blocked by switching off cuff heater 459 and by circulating coolant in channel 458 and all three zones 452, 453 and 454 are heated sufficiently to render the substance impregnating composite filter assembly 450 within these zones substantially stress-free; the filter may now be forwarded against little resistance from the inlet port. During protracted standby periods zones 452 to 454 will be generally cooled to prevent thermal degradation. The various zones making up the inlet port need not be of a single piece; for example the necked portion separating zones 451 and 452 in FIG. 68 may be omitted and the filter assembly, impregnated with annealed substantially solid substance, may be led from zone 452 to zone 451, without interim containment.

When the apertures of the backing support are very large and the impregnant shows a tendency to penetrate deeply into or even through the cooled zone 454, supply tube 457 may be shut off in response to a signal from a simple pneumatic level sensor which may be provided in zone 454 consisting of an air supply bore terminating in a micro-apertured orifice next to one of the filters of assembly 450. This orifice may consist of a sintered metal plate or of tensioned woven steel cloth of about 600 wires per inch or finer; when the impregnant level reaches the orifice, airflow ceases and the rise in air back pressure can be used to switch heater 459 off and actuate a valve causing coolant to flow in channel 458. It was found that most polymers do not adhere well to a cooled orifice of the kinds described so that when the composite filter assembly 450 is moved the orifice is once more unobstructed and the cycle may be repeated. In this embodiment the solid plugs are formed at atmospheric pressure so that the annealing phase may be omitted; accordingly the whole of zone 452 and heaters 455 contained within zone 454 may be omitted. It will be clear that when the backing support is impregnated through one or both filters as shown in FIG. 68, then the impregnant may be supplied from either upstream or downstream of the filter in the filtering enclosure, but if it is injected directly into the backing support as shown in FIG. 67 then it must be clean material.

By virtue of the fact that the composite filter/backing support structure has a considerable cross-sectional size and extends through both the outlet and the inlet ports, it is not necessarily preferred to derive any substantial forwarding drive for the composite structure by forming the outlet port with a large cross-section than the inlet port so that a net hydrostatic force acts upon the sealing plug in the outlet port and tends to extrude the outlet port sealing plug and the composite filter/backing support structure with it. Forwarding drive for the composite structure will therefore generally be derived either by pushing or pulling it and the backing support necessarily will be constructed to accept and withstand the forces it will be subjected to during forwarding of the composite filter/backing support structure. It will be appreciated that no undue forces need be exerted upon the often delicate filter bands or ribbons themselves since the forwarding drive can be applied to the backing support although the filters may well be driven if they are sufficiently strong. Mechanical drive may be applied to the entire composite filter assembly or to any suitable part of it and may comprise traction, thrust, claw drive or a sprocket drive as shown for the case of a forcewise un-balanced filtering assembly in my U.S. Pat. No. 3,645,399. While forwarding movement of the composite filter/backing support structure will generally require the application of a direct mechanical drive, this is not to say that no component of the forwarding drive can be developed hydrostatically in the manner above-described; in fact hydrostatic filter transport utilizing the internal melt pressure according to the teachings of my U.S. Pat. No. 3,471,017 is, where conditions permit its use, the simplest method and in the present case the much reduced frictional drag on the filters which is the main feature of the present invention substantially widens its field of application.

Although the invention has been particularly described by reference to embodiments which are geometrically symmetrical, geometrical symmetry is not an essential feature of apparatus according to this invention so long as the arrangement is such as to obtain substantial equilibrium between the forces acting transversely on the composite filter/backing support structure without awaking large reaction forces from stationary parts. The composite filter/backing support structure thus may have any suitable cross-section such as to provide hydrostatic force equalization which, in extended form, will enable it to be passed through inlet and outlet ports such as to enable the formation of thermal seals in the matter disclosed and claimed in my U.S. Pat. No. 3,471,017.

As previously mentioned herein, the filter bands or ribbons generally comprise woven steel and it is common practice to laminate several layers of different aperture sizes to obtain a more robust structure, the laminate optionally containing one or more layers of metal or glass fibres. Alternatively, the filters are formed of porous sintered metal. The backing support, likewise, can take various forms. As well as the possibilities already mentioned herein another backing support construction comprises one or more coarse woven metal screens optionally formed with local protuberances to afford greater spacing. Another construction has two coarse woven wire screens each provided with spacer ribs and with the ribs of one screen extending longitudinally and the ribs of the other screen extending transversely. Alternatively, spacer wires and rods, also discrete metal plates, have been resistance welded between two wire screens to provide a structure suitable for use as a backing support. A composite filter/backing support structure adapted to provide its own edge sealing in the manner of the arrangement herein described with reference to FIG. 42 and in which the backing support was a woven metal grid having alternate threads turned up and down at its edges so as to define a split-edge configuration has proved advantageous. Finer woven wire layers have been laminated on both sides of such a backing support. Another composite filter/backing support structure has two edge strips in the form of bent or folded high tensile woven wire strip welded each near the apex of its bend or fold to opposite edges of another coarse woven wire strip so as to form a backing support having integral edge sealing, and one or more layers of low tensile woven wire strip overlying the edge strips and the said other strip on both sides of the backing support structure. Alternatively, backing supports comprising perforated sheet-metal strips having pressed deformations (e.g. dimples) such as to afford separation of filter bands sandwiched therewith or comprising metal slab cross-slotted as) for example shown in FIG. 3 of the drawings accompanying my U.S. Pat. No. 3,471,017) on opposite surfaces have also been proved beneficial. A series of abutting, deeply embossed solid metal plates were also found suitable as backing supports. As mentioned previously herein, the backing support and the filter bands or ribbons need not enter the device via the same inlet port and, furthermore, backing supports have been constructed in both flexible and dismantlable forms adapted for continuous recirculation through the device.

Generally the composite filter assembly may, if constructed from inexpensive components, be discarded after use or it may be reprocessed for reuse either as a whole or in part, such reprocessing comprising cleaning the filters when sufficiently heated by burning clean, by counterflow or by solvent extraction. The whole composite assembly may be burned clean either at one station situated along an endless belt or at a remote location segment by segment; alternatively the filters may be discarded and the backing support reused whilst still impregnated with clean filtered substance; it is clearly possible also to clean the backing support and then re-impregnate it in the manner described having first covered it with a fresh complement of filters.

In my U.S. application Ser. No. 389,183, filed Aug. 11, 1973 is disclosed an arrangement in which the backing support is reciprocated and, for advancing the filter, arrangement is made that the filter moves with the backing support in one direction and is prevented from moving with the backing support in its other direction of movement. The present invention and particularly the arrangement of FIG. 4D, could be adapted to the arrangement of application Ser. No. 389,183.

An advantageous arrangement can be realized by connecting in parallel two filtering devices of the general type with which this invention is concerned and providing valve means in the filtered substance outlet of each device operable to shut off its outlet. By operating the two valve means alternately so that the two devices provided their outputs alternately, it can be arranged that filter forwarding takes place in the inoperative device under uniform pressure conditions (i.e. no differential pressure hindering filter forwarding). The two parallel-connected devices could be combined into a single device having an inlet for substance to be filtered, a filtering passage divided into two filtering zones, a filter operating in each filtering zone (separate or at least divided inlet and outlet ports being provided for each filter or at least a divided outlet port containing the two filters), a separate outlet from each filtering zone, and a valve in each of the two outlets. It will be clear that an equivalent filtering arrangement may be constructed in which the flow valves are situated upstream rather than downstream of the filters. The valves could be adapted for operation on the same principles as the thermal inlet and outlet ports thus requiring no moving parts.

FIGS. 69, 70 and 71 primarily, though not exclusively, concerned with the problem of supplying polymeric raw material to spinnerets in the manufacture of synthetic fibres. The problem here is to ensure a continuously finely controlled supply to the spinnerets since any variation in supply may cause a change in gauge or even interruption of the manufactured fibre. Present day arrangements employ a stationary filter which is preceded by a precise gear pump so as to supply an accurately metered flow of raw material to the spinnerets. The gear pumps are required to compensate for progressive clogging of the stationary filter which otherwise would cause progressive pressure and volume changes in the supply to the spinnerets.

It is now proposed to replace the conventional filters with filters of the general type disclosed and claimed in U.S. Pat. No. 3,471,017 (which will avoid much of the supply pressure and volume changes presently encountered by keeping the filters substantially unclogged since they are more readily changed) and to dispense with the gear pumps by recourse to a simple control arrangement hereinafter described which operates on the principle that the flow of a medium having temperature-dependent viscosity through a channel can be controlled by controlling the temperature of the channel and thus, by thermal conduction, controlling the temperature of the medium in the channel which thereby controls its viscosity and hence its flow rate.

In particular when the filtering devices herein described are operated in a mode in which filter forwarding is discontinuous and stepwise, undesirable temporary flow variations may occur which can be smoothed out by making use of the apparatus shown in FIG. 69. A filtering device 501, of any of the types hereinbefore described, is arranged to deliver its output to spinning nozzles (not shown) via a soft (i.e. non-resilient) convoluted metal bellows 502 (which for more streamlined flow, could with advantage be replaced by a thin, collapsible tube made from ductile material such as lead of aluminium) followed by a flexible capillary tube 503 preferably provided with heat exchanging fins 504. The bellows 502 and capillary 503 are contained within a pressurised enclosure 505 filled with a heat transfer fluid such as a high boiling point oil, maintained at a suitable temperature by control means including platinum resistance thermometer 506, annular electric heater 507 and a coil of tubing 500 carrying a stream of coolant when required, cooperating with a conventional potentiometric controller, not shown. Enclosure 505 may alternatively contain pressurised gas, however liquids possessing high specific heat are preferred. A magnetic stirrer 508 is also provided; the wall of enclosure 505 adjacent stirrer 508, the magnetic elements of which should have a high Curie point, is made of a non magnetic material such as brass. The motor activating the stirrer from outside enclosure 505 has been omitted from the drawing. An outlet from the enclosure 505 communicates with a chamber 509 within which a piston 510 loaded by a suitable weight 511 takes up a position determined by the total quantity of fluid in the enclosure. To reduce frictional drag between piston 510 and the surrounding walls of chamber 509 in so far as vertical movements are concerned, the piston 510 may be rotated axially by any convenient means. The piston position is signalled by means of potentiometer 512 to control means governing the supply of raw materials to filter 501; this may comprise a variable-delivery extruder, a temperature-controlled further capillary tube, or any suuitable variable restrictor in a supply pipeline. Volume fluctuations in the material emerging from filter 501 will be accommodated by volume changes of bellows 502 without accompanying pressure changes since the pressure within enclosure 505 remains that prescribed by weight 511 loading piston 510. Residual fluctuations in supply pressure, due for example to the inertia of the weight, are damped out by capillary 503 partly by temperature-dependent viscous resistance to flow within it and in part owing to the substantial increase in kinetic energy imparted to the material when constrained to flow within a relatively long tube of small aperture. Any other variable restrictor may be used in place of capillary 503 such as for example a collapsible tube or a variable orifice. In addition to the function of minimizing the transmission of residual pressure fluctuations, capillary 503 also ensures the delivery of the desired volume flow to the spinning nozzles by virtue of the temperature control of the fluid in enclosure 505. A pressure transducer 513 of, for example, the strain-gauge type is provided to monitor the back pressure in the supply line to the filter and to adjust control means to regulate the filter advance rate. It will be readily seen that, when the filter is actuated to move continuously, the filtering device 501 may be utilised also as a flow control element by maintaining the clogging of the filter at a predetermined level; this may be effected by regulating the filter replacement rate by means of potentiometer 512.

The above-described arrangement ensures that the material supplied to the spinning nozzles has a well defined temperature (the temperature of the heat transfer fluid surrounding the capillary 503) and a well defined pressure (the pressure of the heat transfer fluid). To avoid hunting, the control means responsive to potentiometer 512 should have a relatively slow response and weight 511 may advantageously be replaced by a constant tension spring. It will be clear that the two functions of the fluid contained in enclosure 505 may be separated and that a separate heat exchanger may be used if desired consisting, for example, of a multiply-channeled metal block; however the fast heat transfer rates and good thermal uniformity attainable through the use of convectional heat transfer render the embodiment of FIG. 69 preferable.

FIG. 70 shows a similar arrangement suitable for lower pressures only. The heat transfer fluid is not pressurised but is open to atmospheric pressure and bellows 502 assisted by spring 514 contains the pressure of the material flowing through it; this arrangement is limited to pressures which convoluted bellows of reasonable flexibility can withstand without bursting. Stem 515 carries armature 516 made of a magnetizable material situated within the windings 517 of a differential transformer which acts as a displacement sensor for controlling the volume of material supplied. It is clearly necessary to make all components in the vicinity of armature 516 of non-magnetic materials such as brass or Beryllium copper. As an alternative to the displacement sensor 516, 517 it would be possible to sense instead the level of the liquid in the enclosure.

FIG. 71 shows a schematic arrangement of like elements disposed so as to enable the control of the volume throughput to the spinning nozzles in a more direct manner. The two bellows 518 and 519 and the two capillary coils 520 and 521 are in a series configuration as shown, with bellows 518 and coil 520 contained within enclosure 522 whilst bellows 519 and coil 521 are within enclosure 523. The two enclosures contain heat transfer fluid which may be temperature controlled independently by means not shown and are generally at different pressures; each enclosure communicates with a spring loaded piston as shown at 524 and 525, the springs each having a finite spring rate. It will be seen that the excursion of piston 524 against its spring will depend on the pressure present in enclosure 522 and, if bellows 518 has a negligible resilience, on the pressure of substance within bellows 518. The excursion of piston 525 will likewise depend on the pressure within enclosure 523 and hence, on the pressure of substance within bellows 519. Owing to the resistance to flow of coil 520 which resistance is adjustable within wide limits by suitably controlling the temperature of the heat transfer fluid within enclosure 522, the relative movement of pistons 524 and 525 will depend on and constitute a measure of the amount of substance passing through coil 520 per unit time. A potentiometer 526, disposed so as to register this relative movement, may be utilised to control the supply of substance by providing an input to a corrective control loop adapted to adjust the substance supply rate. Clearly any suitable displacement sensing means may be used in place of potentiometer 526. The temperature of the heat transfer fluid in enclosure 523 is so adjusted that by heat transfer through coil 521 and bellows 519 the final temperature of the melt is that most suited to extrusion through the spinning nozzles which may advantageously be affixed to enclosure 523 as a ready means of controlling their temperature also. It will be clear that any convenient heating means may be utilised, e.g. electric or vapour heating.

Figure 50:
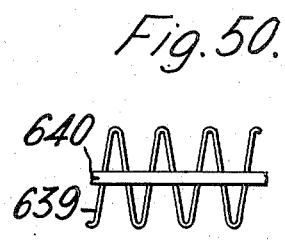

In favourable cases where the volume fluctuations or pressure changes to be damped-out are of small amplitude, diaphragms or membranes may be used in the arrangements of FIGS. 50, 51 and 52 in place of the convoluted bellows or hydraulic cylinders where the pressures and temperatures utilised so permit.

It is to be understood that the foregoing relates only to preferred embodiments of the invention and is to be read as exemplifying rather than limiting the scope of the invention. Numerous substitutions, modifications, alterations and equivalents will be apparent to those skilled in this art which do not depart from the spirit and scope of this invention, and it is intended that such substitutions, modifications, alterations and equivalents shall be embraced within the definitions of the following claims. For example, it has been mentioned herein that composite filter/backing support constructions can be provided in which one surface exposed to the substance to be filtered is imperforate and, by virtue of pressure equalization within the backing support, the arrangement yet can produce hydrostatic pressure force equalization; it will be appreciated that the embodiments employing two or more filter bands associated with a rotary backing support could be likewise modified by replacing one filter with an imperforate band. It will also be appreciated that numerous possibilities exist in regard to effecting the forwarding of the filter. The drive to the filter can be mechanical (pushing or pulling) or hydrostatic, or a combination of the two. A hydrostatically driven arrangement can be controlled mechanically by arranging for hydrostatic drive forces to be opposed by controlling mechanical forces, for example by providing a gate at the exit of the outlet port and only when it is desired to forward the filter opening the gate to permit extrusion of the outlet port sealing plug with consequent filter forwarding.

Also, arrangements are disclosed with two or more filters employing separate inlet and outlet ports for access to and exit from the filtering passage or chamber and alternative arrangements are disclosed in which two filters enter via the same inlet port and exit from the same outlet port; it will be appreciated that a number of filters could enter such via its own inlet port and leave all via the same outlet port, or vice versa.

Furthermore, whilst a number of different forms of backing support have been described, particularly in connection with FIGS. 29 to 56 of the accompanying drawings, it will be appreciated that the forms described are exemplary only of a great many possibilities; for example a plurality of balls, hemispheres or prisms may also serve as a backing support, either loose or contained in a suitable retainer or affixed to a carrying plate.

FIGS. 67 and 68 of the accompanying drawings showed specially formed inlet ports adapted for the impregnation of an incoming filter structure with substance of the type being filtered. As described in connection with these FIGS., each part is formed with an integral impregnation zone thermally insultated from adjacent zones of the port; it is to be appreciated that the impregnation station need not be formed as an integral part of the inlet port, but could by entirely separate therefrom.

I claim:

1. A process for filtering a substance flowing through a passage comprising the steps of introducing a filter by passing it through inlet and outlet ports flanking said passage so that a part of the filter extends across the passage, forcing the substance through the filter part in the passage to filter the substance, providing a flowable sealing substance in said inlet and outlet ports, maintaining temperature conditions at said inlet and outlet ports resulting in the formation therein of sealing plugs of said flowable sealing substance of adequate rigidity to prevent substantial leakage at said ports of the substance being filtered, supporting at least said part of the filter which extends across the passage by means of a movable backing support adapted to receive substance filtering through the filter, equalizing the force applied to the backing support as the result of a hydrostatic pressure differential across the filter urging the filter against the backing support by applying to the backing support a counteracting force thereby at least to reduce the net force tending to restrict the ease of movement of the backing support, effecting movement of said filter through said ports to introduce another part thereof into said passage under conditions providing for maintenance of the said sealing plugs, effecting movement of said backing support with said filter movement so that the backing support serves as a moving bearing for the filter, and extracting said filtered material received in the backing support.

2. A process as claimed in claim 1 wherein the said counteracting force is developed as a result of a hydrostatic pressure differential across at least one other filter supported upon said movable backing support urging said at least one other filter against the backing support.

3. A process as claimed in claim 1 wherein the said movement of the backing support is effected at least in part as the result of a mechanical drive applied thereto.

4. A process as claimed in claim 1 wherein the said filter is keyed to the sealing plug within the outlet port and wherein the hydrostatic pressure of the substance within said passage acting upon the sealing plug within the outlet port is utilized to apply a forwarding drive to said filter as a result of controlled extrusion of said outlet sealing plug.

5. A process as claimed in claim 1 wherein the said backing support exits from the filtering passage via a said outlet port and is keyed to the sealing plug therein and wherein the hydrostatic pressure of the substance within said passage acting upon the sealing plug within the outlet port is utilized to apply a forwarding drive to said backing support as a result of controlled extrusion of said outlet sealing plug.

6. A process for filtering a substance flowing into a chamber comprising the steps of introducing a filter by passing it through inlet and outlet ports flanking said chamber so that a part of the filter extends across the chamber so as to be subject on opposed surfaces thereof to the pressure of substance to be filtered, the filter having an interior permeable to the substance to be filtered, forcing the substance through the filter part in the passage and into the permeable interior thereof, extracting the filtered substance from the said interior of the filter, providing a flowable sealing substance in said inlet and outlet ports, maintaining temperature conditions at said inlet and outlet ports resulting in the formation therein of sealing plugs of said flowable sealing substance of adequate rigidity to prevent substantial leakage from said ports of the substance being filtered, moving the filter when desired to introduce another part thereof into said chamber under conditions providing for maintenance of the sealing plugs, and arranging that forces developed as the result of hydrostatic pressure differentials between the interior and exterior of the filter and acting upon the filter produce substantially no net forces tending to restrict movement of the filter.

7. A process as claimed in claim 6 wherein the said filter is formed as a composite structure comprising at least one filter proper and a backing support therefor.

8. A process as claimed in claim 6 wherein the said filter is formed as an integral self-supporting structure.

9. A process as claimed in claim 6 including impregnating the interior of said filter prior to entry thereof into said chamber with a substance to be introduced into the substance to be filtered.

10. A process as claimed in claim 9 wherein the impregnant substance comprises the same substance as that being filtered.

11. A process as claimed in claim 10 including impregnating the filter interior by bleeding substance from the said chamber.

12. A process as claimed in claim 9 wherein the impregnant substance is an additive substance for introduction into the substance being filtered.

13. A process as claimed in claim 6 wherein the movement of the filter is controlled at least in part as the result of a mechanical force applied thereto.

14. A process as claimed in claim 6 wherein the said filter is keyed to the sealing plug in the outlet port and the hydrostatic pressure of the substance being filtered acting upon the sealing plug within the outlet port is utilized to apply a forwarding drive to said filter as a result of controlled extrusion of said outlet sealing plug.

15. A filtering device including a body defining a passage through which a substance to be filtered can be caused to flow, inlet and outlet ports flanking the passage through which a filter is passed and can be moved to introduce different parts of the filter across the passage, means for providing temperature conditions at the ports for the formation therein, in use, of sealing plugs of a flowable sealing substance of adequate rigidity to permit movement of said filter through said ports without substantial leakage of substance being filtered from the ports, and a movable backing support supporting the filter across the passage and serving as a movable bearing for the filter, the arrangement of the backing support being forcewise symmetrical in that forces applied to the backing support as the result of a hydrostatic pressure differential across the filter urging the filter against the backing support are at least substantially equalized by oppositely directed forces likewise applied to the backing support.

16. A filtering device including a body defining a passage through which a substance to be filtered can be caused to flow, and inlet and outlet ports through which at least one filter can be passed and moved to introduce different filter parts across the passage, said ports being adapted for the provision thereat, in use, of such temperature conditions as to result in the formation within said ports of sealing plugs of a flowable sealing substance of adequate rigidity to prevent substantial leakage of substance being filtered, and a movable backing support serving as a movable bearing for said at least one filter within the passage, the said at least one filter being so arranged relative to the backing support and the arrangement of the backing support being such that forces applied to the backing support in use of the device as a result of a hydrostatic pressure differential across the said at least one filter tend to cancel.

17. A filtering device as claimed in claim 16 wherein said at least one filter is in the form of a single band, said movable backing support is in the form of a generally cylindrical member rotatable about an axis transverse to the direction of filter movement and apertured for extractive flow of filtered substance and said single filter band is looped around said generally cylindrical member.

18. A filtering device as claimed in claim 17 wherein said single filter band is operative for filtering throughout substantially the entire surface area of said generally cylindrical member.

19. A filtering device as claimed in claim 18 including rollers located for guilding said single filter band to loop around said generally cylindrical member.

20. A filtering device as claimed in claim 17 further including means for co-operation with said generally cylindrical member for establishing at least two filtering stations corresponding to areas of the said generally cylindrical member whereat, in use of the device, filtering can take place, the filtering stations being so arranged that hydrostatic forces applied thereto in use tend to equilibrate.

21. A filtering device as claimed in claim 20 wherein said generally cylindrical member comprises a cylindrical drum having apertures in the curved surface thereof communicating with at least one extraction passage, and said means for establishing filtering stations comprises means for masking the apertures in the said curved surface other than in certain regions thereof constituting said filtering stations.

22. A filtering device as claimed in claim 20 wherein said generally cylindrical member has formed therein a plurality of extraction channels each in communication with at least one said aperture in the backing support surface, and said means for establishing filtering stations comprises valve means operative selectively to block flow of filtered substance through said extraction channels.

23. A filtering device as claimed in claim 16 including at least two said filters associated with a single backing support arrangement, each said filter being associated with and operative throughout at least one filtering station established in the supporting surface of the backing support, the said filtering stations being so arranged relative to the backing support arrangement that forces applied to the backing support arrangement at the filtering stations, as the result of hydrostatic pressure differentials across the filters at the filtering stations urging the filters against the backing support arrangement, tend to cancel.

24. A filtering device as claimed in claim 23 wherein said at least two filters are each in the form of a band, and said movable backing support is in the form of a generally cylindrical member rotatable about an axis transverse to the direction of filter movement and apertured for extractive flow of filtered substance.

25. A filtering device as claimed in claim 24 wherein said generally cylindrical member comprises a cylindrical drum having apertures in the curved surface thereof communicating with at least one extraction passage, and said means for establishing filtering stations comprises means for masking the said apertures in the curved surface other than in certain regions thereof constituting said filtering stations.

26. A filtering device as claimed in claim 24 wherein said generally cylindrical member has formed therein a plurality of extraction channels each in communication with at least one said aperture in the backing support surface, and said means for establishing filtering stations comprises valve means operative selectively to block flow of filtered substance through said extraction channels.

27. A filtering device as claimed in claim 23 wherein there are provided two filters and said backing support comprises two cylindrical backing drums, one drum for each said filter, rotatable about axes transverse to the direction of movement of said filters and arranged with their axes of rotation parallel and their curved filtersupporting surfaces in contact, the two drums rotating in use both at the same peripheral speed but in opposite directions.

28. A filtering device as claimed in claim 27 including a single said inlet port and a single said outlet port for said two filters.

29. A filtering device as claimed in claim 16 wherein the said outlet port presents a greater effective area to said passage than said inlet port whereby the hydrostatic pressure of the substance being filtered produces a net force tending to extrude the sealing plug in the outlet port and thereby tending to forward the filter.

30. A filtering device as claimed in claim 16 including means for cooperation with the backing support for establishing filtering stations corresponding to areas of the backing support only whereat in use of the device filtering can take place, the filtering stations being so arranged relative to the backing support that forces applied to the backing support at the filtering stations, as the result of hydrostatic pressure differentials developed across the filters at the filtering stations, at least substantially equilibrate.

31. A filtering device as claimed in claim 30 wherein said means for establishing said filtering stations includes means to establish temperature conditions in areas of the backing support, other than said areas only whereat in use of the device filtering can take place, such that in such areas the substance being filtered becomes too viscous for passage through the filter band.

32. A filtering device as claimed in claim 31 wherein heating means are provided in the regions of said filtering stations, and the regions next adjacent said filtering stations are adapted for cooling, heat insulation means being provided between the thus-heated and the thus-cooled regions.

33. A filtering device as claimed in claim 30 wherein said movable backing support comprises a cylindrical drum mounted for rotation about an axis transverse to the direction of filter movement, the circumferential curved surface of said drum constituting the filter supporting surface thereof, apertures are provided in the supporting surface of the backing support throughout a central portion of the circumferential curved surface of said drum between two end portions thereof, a plurality of extraction channels are formed in said drum, each said extraction channel communicating with at least one said aperture, and said means for establishing said filtering stations comprises valve means operative selectively to block flow of filtered substance through said extraction channels.

34. A filtering device as claimed in claim 33 wherein said valve means is constituted by cooperating apertures formed in a surface of said cylindrical drum and in a closely-contacting surface of a non-rotating member, said apertures in said surface of said cylindrical drum communicating with said extraction channels and said apertures in said surface of said non-rotating member communicating with an outlet for filtered substance, said valve means being open when said drum apertures are in registry with said member apertures and otherwise being closed.

35. A filtering device as claimed in claim 34 wherein said drum is mounted for rotation on a shaft and said member is non-rotatable relative to said shaft.

36. A filtering device as claimed in claim 35 wherein said member comprises a disc-shaped member, said drum has a recess in an axial end thereof, said disc-shaped member being received in said recess, and said cooperating surfaces defining said valve means are constituted by the edge surface of said disc-shaped member and an adjacent surface of said recess.

37. A filtering device as claimed in claim 36 including sealing means preventing incursion of unfiltered substance into the junction of said disc-shaped member and said drum.

38. A filtering device as claimed in claim 37 wherein said sealing means comprises a diaphragm seal adapted to overlie said junction.

39. A filtering device as claimed in claim 16 wherein said movable backing support comprises a plurality of generally cylindrical members mounted in a sequential array and each rotatable about an axis transverse to the direction of filter movement, said array of generally cylindrical members serving on one side thereof as a movable bearing for one band and on the other side thereof as a movable bearing for a second band, at least one of said bands comprising a filter.

40. A filtering device as claimed in claim 16 wherein said movable backing support comprises a hollow cylindrical drum rotatably received within a recess formed within the said body of the device, said recess having at least two arcuate enlargements defining filtering chambers, each of said filtering chambers having an inlet for substance to be filtered an inlet port for the respective filter and an outlet port, said inlet and outlet ports being formed in the body of the device around said filtering chambers.

41. A filtering device as claimed in claim 40 wherein said outlet ports are of greater cross-sectional area than said inlet ports whereby the hydrostatic pressure of the substance being filtered produces net forces tending to extrude the sealing plugs in the outlet ports, the arrangement being such that said net forces apply to the backing support a resultant torque for rotation thereof in the direction of filter forwarding.

42. A filtering device as claimed in claim 16 wherein said backing support is in the form of a hollow cylindrical drum having a hollow inner hub joined thereto by means of a web, extraction channels in said web communicating between apertures in said drum and said hollow inner hub, and means are provided in parts of the body of the device closely adjacent said web for providing such temperature conditions as to result in the formation between said body part and the said web of seals of sufficiently solidified substance preventing substantial leakage of substance.

43. A filtering device including a body defining a passage through which a substance to be filtered can be caused to flow, and slotted inlet and outlet ports flanking said passage through which a filter in the form of a band is passed and can be moved to introduce different filter parts across said passage, means for maintaining temperature conditions at said ports for the formation therein, in use, of sealing plugs of a flowable sealing substance of adequate rigidity to permit movement of said filter through said ports without substantial leakage of substance being filtered, the device further including a movable backing support in the form of a generally cylindrical member mounted for rotation about an axis transverse to the direction of filter movement and serving as a movable bearing for the filter, said member having openings in its circumferential curved surface in fluid flow communication with at least one extraction passage formed within the member, said openings serving in use for admitting filtered substance which passes through the filter supported upon said surface into said at least one extraction passage, and the filter being looped around the said member so as to be operative throughout substantially the entire curved surface area of the said member whereby forces applied to the said member in use of the device as the result of a hydrostatic pressure differential across the filter urging the filter against the member produce at least substantially no net force tending to restrict the ease of rotation of the said member.

44. A filtering device including a body defining a passage through which a substance to be filtered can be caused to flow, and slotted inlet and outlet ports flanking said passage through which a filter in the form of a band is passed and can be moved to introduce different filter parts across said passage, means for maintaining temperature conditions at said ports for the formation therein, in use, of sealing plugs of a flowable sealing substance of adequate rigidity to permit movement of said filter through said ports without substantial leakage of substance being filtered, the device further including a movable backing support in the form of a generally cylindrical member mounted for rotation about an axis transverse to the direction of filter movement and serving as a movable bearing for the filter, said member having openings in its circumferential curved surface in fluid flow communication with at least one extraction passage formed within the member, said openings serving in use for admitting filtered substance which passes through the filter supported upon said surface into said at least one extraction passage, and means cooperating with the backing support to establish at least two filtering stations corresponding to areas of the backing support only whereat in use of the device filtering can take place, the filter being looped around the said member so as to be operative at said at least two filtering stations and the filtering stations being so arranged relative to the backing support that forces developed thereat upon the backing support as the result of a hydrostatic pressure differential across the filter in the region of each filtering station urging the filter against the backing support tend to cancel thereby producing at least substantially no net force tending to restrict the ease of movement of the backing support.

45. A filtering device including a body defining a passage through which a substance to be filtered can be caused to flow and slotted inlet and outlet ports flanking said passage through which at least two filters each in the form of a band are passed and can be moved to introduce different filter parts across the passage, said ports being adapted for the provision thereat in use of such temperature conditions as to result in the formation therein of sealing plugs of a flowable sealing substance of adequate rigidity to prevent substantial leakage of substance being filtered, a movable backing support supporting said at least two filters across the passage and serving as movable bearings for the filters, the backing support being adapted to receive filtered substance passing through the filters and being in fluid flow communication with at least one extraction channel for filtered substance, and means for cooperation with the backing support for establishing filtering stations corresponding to areas of the backing support only whereat in use of the device filtering can take place, each of said at least two filters being associated with and operative throughout at least one said filtering station and the filtering stations being so arranged relative to the backing support that forces applied to the backing support as a result of hydrostatic pressure differentials developed across the filters at the filtering stations urging the filters against the backing support at least substantially equilibrate.

46. A filtering device as claimed in claim 45 wherein said movable backing support comprises a cylindrical drum having extraction apertures for filtered substance in the circumferential curved surface thereof, and said means for establishing filtering stations comprises means for masking the apertures in the said circumferential curved surface of the said cylindrical drum other than in certain regions thereof constituting said filtering stations.

47. A filtering device as claimed in claim 45 wherein said movable backing support comprises a cylindrical drum having extraction apertures for filtered substance in the circumferential curved surface thereof, and there are provided a plurality of said extraction channels each in communication with at least one said aperture in a different area of the backing support surface, and said means for establishing filtering stations comprises valve means operative selectively to block flow of filtered substance through said extraction channels.

48. A filtering device as claimed in claim 45 wherein said movable backing support comprises a cylindrical drum mounted for rotation about an axis transverse to the direction of filter movement, the circumferential curved surface of said drum constituting the filter supporting surface thereof, a plurality of apertures for extraction of filtered substance are formed in a central portion of the circumferential curved surface of said drum between two end portions thereof, a plurality of extraction channels are formed in said drum, each said extraction channel communicating with at least one said aperture, and said means for establishing said filtering stations comprises valve means operative selectively to block flow of filtered substance through said extraction channels.

49. A filtering device as claimed in claim 48 wherein said valve means comprises a spring-loaded valve member in each said extraction channel and cam means selectively operating the said spring-loaded valve members of said plurality of extraction channels as said cylindrical drum rotates in use.

50. A filtering device as claimed in claim 48 wherein said valve means is constituted by cooperating apertures formed in a surface of said cylindrical drum and in a closely-contacting surface of a non-rotating member, said apertures in said surface of said cylindrical drum communicating with said extraction channels and said apertures in said surface of said non-rotating member communicating with an outlet for filtered substance, said valve means being open when said drum apertures are in registry with said member apertures and otherwise being closed.

51. A filtering device as claimed in claim 50 wherein said drum is mounted for rotation on a shaft, said member is non-rotatably keyed to said shaft, said member comprises a disc-shaped member, said drum has a recess in an axial and thereof, said disc-shaped member being received in said recess, and said cooperating surfaces defining said valve means are constituted by the edge surface of said disc-shaped member and an adjacent surface of said recess.

52. A filtering device as claimed in claim 51 including sealing means preventing incursion of unfiltered substance into the outlet by way of the junction of said disc-shaped member and said drum.

53. A filtering device as claimed in claim 52 wherein said sealing means comprises a diaphragm seal adapted to overlie said junction.

54. A filtering device as claimed in claim 45 wherein there are provided two said filters and said backing support comprises two cylindrical backing drums, one drum serving as movable bearing for each said filter, said drums being arranged with their axes of rotation parallel and their curved surfaces in contact, the two drums rotating, in use, both at the same peripheral speed but in opposite directions.

55. A filtering device as claimed in claim 54 including mounting means for said two backing drums, said mounting means enabling a degree of movement of said backing drums in a direction towards and away from each other and including spring means urging said backing drums together.

56. A filtering device as claimed in claim 45 wherein said movable backing support comprises a plurality of generally cylindrical members mounted in a sequential array and each rotatable about an axis transverse to the direction of filter movement, said array of generally cylindrical members serving on one side thereof as a movable bearing for one filter band and on the other side thereof as a movable bearing for a second filter band.

57. A filtering device as claimed in claim 45 wherein said means for establishing said filtering stations includes means to establish temperature conditions in areas of the backing support, other than said areas only whereat in use of the device filtering can take place, such that in such areas the substance being filtered becomes too viscous for passage through the filter band.

58. A filtering device as claimed in claim 45 wherein said movable backing support comprises a hollow cylindrical drum rotatably received within a recess formed within the said body of the device, said recess having at least two arcuate enlargements defining filtering chambers, one said filtering chamber being provided for each of said at least two filters, each of said filtering chambers having an inlet for substance to be filtered and an inlet port and an outlet port for the respective filter, said inlet and outlet ports being formed in the body of the device around said filtering chambers.

59. A filtering device as claimed in claim 58 wherein said outlet ports are of greater cross-sectional area than said inlet ports whereby the hydrostatic pressure of the substance being filtered produces net forces tending to extrude the sealing plugs in the outlet ports, the arrangement being such that said net forces apply to the backing support a resultant torque for rotation thereof in the direction of filter forwarding.

60. A filtering device as claimed in claim 58 wherein said hollow cylindrical drum has hollow inner hub joined thereto by means of a web, extraction channels in said web communicating between apertures in said drum and said hollow inner hub, and means are provided in parts of the body of the device closely adjacent said web for providing such temperature conditions as to result in the formation between said body parts and the said web of seals of sufficiently solidified substance preventing substantial leakage of substance.

61. A filtering device as claimed in claim 45 wherein the said inlet and outlet ports are of different cross-sectional area whereby the hydrostatic pressure of the substance being filtered produces a net force tending to extrude the sealing plug in the outlet port, the arrangement being such that said net force applies to the filters a forwarding drive in the direction of filter movement.

62. A filtering device as claimed in claim 45 wherein said at least two filters are each in the form of a band comprising a plurality of successive filtering elements, the arrangement being such that said filtering elements locate successively with said filtering stations as said filters are moved.

63. A filtering device including a body defining a passage through which a substance to be filtered can be caused to flow, and inlet and outlet ports flanking said passage through which at least one filter in the form of a succession of individual filter elements is passed so as to extend across said passage and can be moved to introduce different filter elements into operative condition at least two at a time, means for maintaining temperature conditions at said ports for the formation therein, in use, of sealing plugs of a flowable sealing substance of adequate rigidity to prevent substantial leakage through said ports of substance being filtered, a movable backing support in the form of a generally cylindrical member mounted for rotation about an axis transverse to the direction of filter movement and serving as a movable bearing for said at least one filter, said member having openings in its circumferential curved surface adaped for location with said filter elements and in fluid flow communication with at least one extraction passage formed within the member, said openings serving in use for admitting filtered substance which passes through the at least two operative filter elements supported upon said surface into said at least one extraction passage, and means for preventing extraction of substance via openings not located with the at least two operative filter elements, the said at least one filter being so arranged relative to the backing support and the arrangement of the backing support being such that forces applied to the backing support in use of the device as the result of hydrostatic pressure differentials across the said at least two operative filter elements tend to cancel.

64. A filtering device as claimed in claim 63 including means cooperating with the backing support to establish at least two filtering stations corresponding to areas of the backing support only whereat in use of the device filtering can take place, the filtering stations being so arranged relative to the backing support that forces applied to the backing support at the filtering stations, as the result of hydrostatic pressure differentials developed across the filter elements at the filtering stations, at least substantially equilibrate, and means to ensure registry of said operative filter elements with said filtering stations.

65. A filtering device as claimed in claim 64 wherein the surface of said generally cylindrical member is formed with portions complementary to the shape of and adapted to receive the filter elements.

66. A filtering device as claimed in claim 64 wherein two such filters are associated with a single said generally cylindrical backing support, each said filter being operative at at least one individually assigned filtering station.

67. A filtering device as claimed in claim 63 wherein said succession of filter elements constituting a said filter are linked together in a chain construction.

68. A filtering device as claimed in claim 63 wherein said succession of filter elements constituting a said filter are separate from one another.

69. A filtering device as claimed in claim 68 including drive means operative to push said separate filter elements successively into the device.

70. A filtering device including a body defining a chamber into which a substance to be filtered can be caused to flow, inlet and outlet ports flanking the chamber through which a filter structure is introduced into the chamber so as, in use of the device, to be subject on opposed surfaces thereof to the pressure of substance to be filtered, said filter structure being movable to introduce different filter parts into the chamber, means for providing temperature conditions at the ports for the formation therein, in use, of sealing plugs of a flowable sealing substance of adequate rigidity to prevent substantial leakage of substance being filtered from the ports, said filter structure having an interior adapted and arranged to receive only substance filtering through said filter structure and to permit the flow of filtered substance within the said interior and between said opposed surfaces for extraction thereof from the filtering device, at least one outlet for filtered substance in fluid flow communication with said interior of the filter structure and means preventing flow of substance to be filtered directly into said at least one outlet from the said chamber.

71. A filtering device as claimed in claim 70 wherein said filter structure comprises at least one filter proper and a backing support therefor, aaid filter structure interior being constituted by said backing support.

72. A filtering device as claimed in claim 71 wherein said filter structure comprises two bands sandwiching therebetween said backing support, at least one of said bands comprising said at least one filter proper, the arrangement of said chamber being such that both said two bands are subject in use to the pressure of substance to be filtered.

73. A filtering device as claimed in claim 70 wherein said filter structure is adapted for edgewise extraction of filtered substance permeating into the said interior thereof, edges of the said filter structure being sealed against internal walls of said chamber, and outlets for filtered substance in said internal walls communicating with said edges.

74. A filtering device as claimed in claim 73 wherein seals are provided preventing flow of substance to be filtered directly into said outlets, said seals comprising sealing strips arranged along the edges of the said filter structure.

75. A filtering device as claimed in claim 72 wherein said backing support comprises a corrugated metal band the corrugations of which extend substantially transversely to the length of the band, and the said two bands are separated by the corrugations of said corrugated metal band.

76. A filtering device as claimed in claim 70 wherein said filter structure is adapted for edgewise extraction of filtered substance permeating into the interior thereof, said filter structure being supported at edges thereof within the said chamber by means of rod-shaped members which extend across the said chamber spaced from the walls thereof, said rod-shaped members having formed therein extraction passages in fluid flow communication with the edges of said composite structure for extractive flow of filtered substance from the interior thereof.

77. A filtering device as claimed in claim 76 wherein each of said rod-shaped members is formed in two longitudinal parts which come together to define in said member a recessed seat for the edge of said filter structure, a longitudinal passage for extraction of filtered substance from the device, apertures providing communication between said recessed seat and said longitudinal passage for flow of filtered substance from the interior of the filter structure into said longitudinal passage, and a seat for a sealing strip to seal said two longitudinal parts together.

78. A filtering device as claimed in claim 76 wherein said rod-shaped members are each formed with a recessed seat to receive an edge of the said filter structure, apertures providing communication between said recessed seat and a longitudinal extraction passage formed within said rod-shaped member.

79. A filtering device as claimed in claim 70 wherein said filter structure comprises a succession of discrete filter elements each having an interior and each adapted for extractive flow of filtered substance from said interior thereof.

80. A filtering device as claimed in claim 70 wherein said backing support comprises a plurality of transverse separator slats.

81. A filtering device as claimed in claim 80 wherein said transverse separator slats are each comprised by a permeable tubular member permitting filtered substance flow through at least one surface thereof and into at least one internal flow passage formed therein and adapted to communicate with the filtering device outlet.

82. A filtering device as claimed in claim 80 wherein said transverse separator slats are each comprised by hollow elements providing flat filter-supporting surfaces perforated for filtered substance flow therethrough.

83. A filtering device as claimed in claim 82 wherein said filters comprise individual filter sections carried upon said flat filter-supporting surfaces.

84. A filtering device as claimed in claim 70 wherein said filter structure comprises a plurality of discrete filter elements contained in apertures formed in a pair of continuous metal tapes.

85. A filtering device as claimed in claim 71 wherein said filter structure comprises a folded sheet of sintered metal constituting said filter proper supported by an inner permeable backing support and arranged for sliding movement over a guide member provided within the filtering passage and having extraction channels formed therein.

86. A filtering device as claimed in claim 70 wherein said filter structure is constructed to restrict flow of filtered substance in the direction of filter movement.

87. A filtering device as claimed in claim 70 including means operative to impregnate the interior of the filter structure with substance of the type to be filtered before entry thereof into said chamber.

88. A filtering device as claimed in claim 87 including an impregnation station and a feed passage provided in the body of the device to bleed substance to said impregnation station.

89. A filtering device as claimed in claim 87 including means operative to control the supply of impregnant, said means including means for sensing the extent of penetration of impregnant into the interior of the filter structure in in a direction opposite to the direction of movement of the filter structure into the inlet port.

90. A filtering device as claimed in claim 88 wherein said impregnation station is formed integrally with the inlet port through which said filter structure is admitted to the device.

91. A filtering device as claimed in claim 90 wherein said impregnation station comprises a zone of said inlet port provided with heating means and intermediate and thermally insulated from two zones provided with cooling means, said feed passage connecting with said inlet port intermediate zone.

92. A filtering device as claimed in claim 91 wherein said cooled zones are arranged to be selectively heated or cooled, and a further cooled zone is provided in the inlet port, said further cooled zone being located to be the last zone traversed by the filter structure during entry thereof into the device.

93. A filtering device including a body defining a chamber into which a substance to be filtered can be caused to flow, slotted inlet and outlet ports flanking said chamber through which two filters each in the form of a band can be passed and moved to introduce different parts of said filters across the chamber, inlet and outlet ports flanking said chamber for the introduction into and extraction from the chamber of a plurality of filter support elements, said two filter bands and said filter support elements forming within the chamber a composite filter/backing support structure which is movable through the chamber and has the said filter support elements sandwiched between the filter bands with the filter support elements extending transversely to the length of the filters, said filter support elements being formed to provide a facility for extractive flow of filtered substance in a direction transverse to the flow of substance through the filters during filtering, at least one outlet for filtered substance arranged for extraction of filtered substance permeated into the backing support, and sealing means in said chamber permitting movement of said composite structure whilst preventing flow of substance to be filtered directly into said at least one outlet.

94. A filtering device including a body defining a chamber into which a substance to be filtered can be caused to flow, inlet and outlet ports flanking said chamber through which a filter structure is introduced into the chamber so as, in use of the device, to be subject on opposed surfaces thereof to the pressure of substance to be filtered, said filter structure being movable to introduce different filter parts into the chamber, means for providing temperature conditions at said ports resulting in the formation therein, in use, of sealing plugs of a flowable sealing substance, at least one outlet for filtered substance adapted for fluid flow communication with a portion of said filter structure, means sealing said at least one outlet to said portion to prevent direct flow of substance to be filtered into said at least one outlet while permitting movement of said filter structure, said filter structure comprising a composite structure of at least one filter proper and a permeable backing support therefor, said permeable backing support defining in said filter structure an interior adapted and arranged to receive substance filtering through said at least one filter proper and to permit the flow of filtered substance within the said interior and between said opposed surfaces for extraction thereof from the filter device, and said at least one outlet communicating with said permeable backing support.

95. A filtering device as claimed in claim 94 wherein the filter proper and the backing support therefor are formed integrally with one another.

96. A filtering device as claimed in claim 94 wherein said filter structure comprises a permeable backing support sandwiched between two bands at least one of which comprises a filter, extraction of filtered substance taking place from the edges of said sandwich.

97. A filtering device as claimed in claim 94 wherein the interstices of at least the permeable backing support are impregnated with a substance to be introduced into the filtered substance.

98. A filtering device as claimed in claim 97 wherein said substance to be introduced includes an additive substance different from the filtered substance.

99. A filtering device as claimed in claim 94 wherein said backing support comprises sintered metal.

100. A filtering device as claimed in claim 99 wherein said sintered metal backing support is formed with internal extraction passageways and reinforcing means are provided in said passageways for strengthening the backing support.

101. A filtering device as claimed in claim 94 wherein said backing support includes helical wire coils.

102. A filtering device as claimed in claim 94 wherein said backing support comprises bent or convoluted sheet or strip metal.

103. A filtering device as claimed in claim 94 wherein said backing support comprises a plurality of discrete spacers secured together to form a band.

104. A filtering device as claimed in claim 94 wherein said at least one filter proper comprises fine woven wire cloth and said backing support comprises coarse woven wire cloth.

105. A filtering device as claimed in claim 94 wherein said filter structure comprises a plurality of discrete filtering elements received in the apertures of at least one flexible metal ladder tape, said filtering elements each having an interior adapted to receive substance filtered by the respective element and to permit extractive flow of the filtered substance.

106. A filtering device as claimed in claim 105 wherein said elements are formed of sintered metal.

107. A filtering device as claimed in claim 106 wherein said sintered metal elements are each faced with at least one filter element formed of woven wire cloth.

108. A filtering device as claimed in claim 94 wherein said filter structure comprises a plurality of permeable sintered metal elements each adapted for exposure to substance to be filtered at at least one surface thereof for permeation of substance into the interior of the element, the elements furthermore being formed to provide a facility for extractive flow of filtered substance received within the interior thereof towards said at least one outlet.

109. A filtering device as claimed in claim 106 wherein said sintered metal elements each have a hollow interior.

110. A filtering device as claimed in claim 94 wherein said filter structure comprises a plurality of discrete elements each provided with sealing skirts adapted to overlap with like sealing skirts of an abutting like element to prevent substantial flow of substance between abutting elements.

111. A filtering structure as claimed in claim 108 provided with sealing skirts adapted to overlap with like sealing skirts of an abutting like element to prevent substantial flow of substance between the two elements.

112. A filtering device as claimed in claim 94 wherein said filter structure includes at least one layer of woven wire cloth and at least one other layer, and means are provided to restrict the flow of filtered substance within said layers in the plane of said layers.

113. A filtering device as claimed in claim 15 further including means connected to the filtered substance outlet of said device for filtering, for reducing pressure fluctuations in said filtered substance, said means including a fluid-filled enclosure, pressure control means for maintaining constant the pressure of said fluid in said enclosure, temperature control means for maintaining constant the temperature of said fluid in said enclosure, an at least substantially non-resilient volume variable pressure-transfer member within said enclosure, said presssure-transfer member having an exterior subject to the pressure of said fluid in said enclosure and an interior isolated from said exterior and in fluid flow communication with said filtered substance outlet of said device, and an outlet for filtered substance communicating with said interior of said pressure-transfer member.

114. A combination as claimed in claim 113 wherein said pressure transfer member is arranged to deliver the flow of substance passing through it to said outlet by way of hydrostatic damping means.

115. A combination as claimed in claim 114 wherein said hydrostatic damping means comprises a capillary contained within said enclosure.

116. A combination as claimed in claim 115 wherein said capillary is provided with heat exchanger means by virtue of which the temperature of the substance flowing within the capillary is determined to be that of the said enclosure.

117. A combination as claimed in claim 113 wherein said pressure transfer member is arranged to deliver the flow of substance passing through it to said outlet by way of heat exchanger means adapted to determine the temperature of said substance to be that of said enclosure.

118. A combination as claimed in claim 113 wherein said pressure transfer member comprises a flexible tubular member.

119. A filtering device as claimed in claim 15 further including means connected to the filtered substance outlet of said device for filtering for monitoring the volume of filtered substance supplied thereby, said means including two series-connected non-resilient bellows members each contained in a separate temperature-controlled enclosure filled with a heat-transfer fluid and each having associated therewith a series-connected capillary, the capillary associated with the first said bellows member having an outlet into the second said bellows member and the capillary associated with the second said bellows member communicating with a system output, a pressure chamber communicating with said first enclosure, a spring loaded piston in said pressure chamber movable in dependence upon the pressure therein, a second pressure chamber communicating with said second enclosure, a second spring loaded piston in said second pressure chamber movable in dependence upon the pressure therein, snd means responsive to the differential displacements of said first and second pistons for providing an indication of fluid flow.

* * * * *

UNITED STATES PATENT OFFICE
CERTIFICATE OF CORRECTION

Patent No. 3,856,674   Dated December 24, 1974

Inventor(s) PETER GABOR KALMAN

It is certified that error appears in the above-identified patent and that said Letters Patent are hereby corrected as shown below:

In the heading of the patent, immediately following the application serial number, please insert:

--Foreign Application Priority Data

April 19, 1972 - Great Britain - 18,194

October 10, 1972 - Great Britain - 46,683 --

Signed and sealed this 15th day of July 1975.

(SEAL)
Attest:

RUTH C. MASON
Attesting Officer

C. MARSHALL DANN
Commissioner of Patents
and Trademarks